(12) United States Patent
Kujirai

(10) Patent No.: US 7,535,591 B2
(45) Date of Patent: May 19, 2009

(54) PRINT CONTROL METHOD, APPARATUS AND PROGRAM FOR DISPLAYING A PREVIEW IMAGE

(75) Inventor: Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1126 days.

(21) Appl. No.: 10/703,515

(22) Filed: Nov. 10, 2003

(65) Prior Publication Data

US 2004/0177336 A1 Sep. 9, 2004

(30) Foreign Application Priority Data

Nov. 11, 2002 (JP) ............................. 2002-327143

(51) Int. Cl.
G06K 15/00 (2006.01)
G06F 3/12 (2006.01)
G06F 15/00 (2006.01)

(52) U.S. Cl. ..................... 358/1.16; 358/1.1; 358/1.9

(58) Field of Classification Search .............. 358/1.1, 358/1.9, 1.16; 715/274
See application file for complete search history.

(56) References Cited

U.S. PATENT DOCUMENTS

| | | | |
|---|---|---|---|
| 5,995,719 A * | 11/1999 | Bourdead'hui et al. ...... | 358/1.12 |
| 6,594,033 B1 | 7/2003 | Kujirai et al. ............... | 358/1.18 |
| 6,616,359 B1 * | 9/2003 | Nakagiri et al. ............. | 400/582 |
| 6,654,509 B2 | 11/2003 | Nishikawa et al. .......... | 382/298 |
| 7,177,045 B2 * | 2/2007 | Goel et al. .................. | 358/1.18 |
| 2001/0050781 A1 | 12/2001 | Kujirai ....................... | 358/1.15 |
| 2004/0047510 A1 * | 3/2004 | Kawabata .................... | 382/232 |
| 2004/0120010 A1 * | 6/2004 | Back et al. .................. | 358/1.18 |

FOREIGN PATENT DOCUMENTS

| JP | 09185606 A | * | 7/1997 |
|---|---|---|---|
| JP | 10319567 A | * | 12/1998 |
| JP | 2001130083 A | * | 5/2001 |

* cited by examiner

*Primary Examiner*—Edward L Coles
*Assistant Examiner*—Thomas J Lett
(74) *Attorney, Agent, or Firm*—Fitzpatrick, Cella, Harper & Scinto

(57) ABSTRACT

This invention provides a convenient print control program, and print control method and apparatus. To accomplish this, this invention provides a print control program which can control a printing apparatus to print a plurality of images having a predetermined order on a plurality of print media which are to be bound in a booklet, and makes a computer execute: a generation step of generating a print job to be transmitted to the printing apparatus; a selection step of prompting, when a print result obtained upon executing a print process according to the print job is displayed as a preview image, the user to select a display method; and a preview step of displaying the print result as the preview image in accordance with the selection result in the selection step.

10 Claims, 41 Drawing Sheets

FIG. 10

| | |
|---|---|
| ID WHICH CAN IDENTIFY JOB | ~1001 |
| JOB SETUP INFORMATION | ~1002 |
| NUMBER OF PHYSICAL PAGES OF JOB | ~1003 |
| FIRST PHYSICAL PAGE INFORMATION | ~1004 |
| SECOND PHYSICAL PAGE INFORMATION | ~1005 |
| . . . | ~1006 |
| LAST PHYSICAL PAGE INFORMATION | ~1007 |

FIG. 18

JOB EDIT

COMBINED JOB NAME: Microsoft Word-HOUSE JOURNAL pr.doc

TOTAL PAGES 2

DELETE PAGE
PREVIEW

TARGET JOB LIST | PRINT SETUP

NUMBER OF COPIES (C): 1 COPIES (1~255)
PRINT METHOD (Y): 1-SIDED PRINT
☐ STAPLE
☐ SADDLE STITCHING (I)

☑ APPLY COMMON LAYOUT
PAGE LAYOUT (L): 1 PAGE/SHEET
LAYOUT ORDER (X):
☐ JOB BOUNDARY SETUP:

MORE OPTIONS...

REVERT TO DEFAULTS    OK    CANCEL    HELP

FIG. 30

```
┌─────────────────────────────────────────────────────────────┐
│ DETAILED SETTING FOR BOOKLET                         [?][X] │
│                                                             │
│ BOOKLET PRINTING METHOD (B):  ⊙ ┌ALL PAGES AT ONCE┐         │
│                               ○ DIVIDE INTO SETS            │
│                                 [15⇅] SHEETS PER SET (1~15)(S) │
│─────────────────────────────────────────────────────────────│
│ BINDING DIRECTION (O): [📖 LEFT BINDING ▼]                  │
│                                                             │
│ ☐ USE BOOKLET GUTTER SETTINGS (G): [5 ⇅] mm(0~30)           │
│─────────────────────────────────────────────────────────────│
│ ☑ DESIGNATE COVER PAGES (C) ～ 3001    3003         3004   │
│   ┌──────────────────────────────┐                          │
│   │ NUMERICAL VALUE DESIGNATION  │                          │
│   │   ☑ FRONT COVER              │ [1 ⇅]   [            ▼] │
│   │   ☐ INSIDE FRONT COVER       │ [5 ⇅]   [LAST PAGE   ▼] │
│   │   ☐ INSIDE BACK COVER        │ [6 ⇅]   [BLANK       ▼] │
│   │   ☑ BACK COVER               │ [2 ⇅]   [            ▼] │
│   └──────────────────────────────┘                          │
│    )                                                        │
│   3002                    [  OK  ]  [ CANCEL ]  [ HELP(H) ] │
└─────────────────────────────────────────────────────────────┘

┌─────────────────┐
                                        │ BLANK        ▼ │
                                        ├─────────────────┤
                                        │ BLANK  ///////  │
                                        │ LAST PAGE - 3   │
                                        │ LAST PAGE - 2   │
                                        │ LAST PAGE - 1   │
                                        │ LAST PAGE       │
                                        └─────────────────┘
``` and# PRINT CONTROL METHOD, APPARATUS AND PROGRAM FOR DISPLAYING A PREVIEW IMAGE

FIELD OF THE INVENTION

The present invention relates to a technique for controlling a print process.

BACKGROUND OF THE INVENTION

Conventionally, a print preview function is known. With this function, an image to be printed is displayed on a screen as a layout and is presented to the user before data is actually printed on a paper sheet upon printing data such as a document or image edited by a document or image edit application program.

The user can confirm the layout and layout information of pages (logical pages) sent from an application by checking an image to be printed using this print preview function.

In a booklet printing process that prints data to lay out pages in an original order by binding printed sheets (folding them into two), if a preview process is made in consideration of the page order that the user wants, a layout to be rendered on physical pages to be actually output cannot be accurately expressed. Conversely, when a preview process is made in consideration of the output appearance of physical pages, since logical pages are displayed not in the order that the user intended, it becomes difficult for him or her to imagine based on the previewed layout if pages are to be printed correctly.

However, there is no mechanism that allows the user to switch the aforementioned preview methods, and a preview function as the booklet printing preview method is insufficient.

Furthermore, in a print control apparatus having a function of laying out logical pages corresponding to a front cover page, inside front cover page, inside back cover page, and back cover page on a paper sheet which is set on the outermost side of a booklet, and executing a normal booklet printing process on paper sheets for a body text part, which are set at the inner side, both a preview that handles cover pages as part of booklet pages, and a preview that independently handles cover pages and body text pages cannot be confirmed.

Therefore, such function is often inconvenient for the user.

SUMMARY OF THE INVENTION

The present invention to provides a convenient print control technique.

More specifically, a program according to the present invention is directed to a print control program which can control a printing apparatus to print a plurality of images having a predetermined order on a plurality of print media which are to be bound in a booklet, the program making a computer execute:

a generation step of generating a print job to be transmitted to the printing apparatus;

a selection step of prompting, when a print result obtained upon executing a print process according to the print job is displayed as a preview image, the user to select a display method; and a preview step of displaying the print result as the preview image in accordance with the selection result in the selection step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 shows an example of the data format to be passed upon issuing a print request of physical pages from the spool file manager 304 to the despooler 305;

FIG. 18 shows an example of a window of the setup change editor 307;

FIG. 30 shows an example of a cover page booklet printing setting method;

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Hardware Arrangement of Printer Control System>

Figure 1:
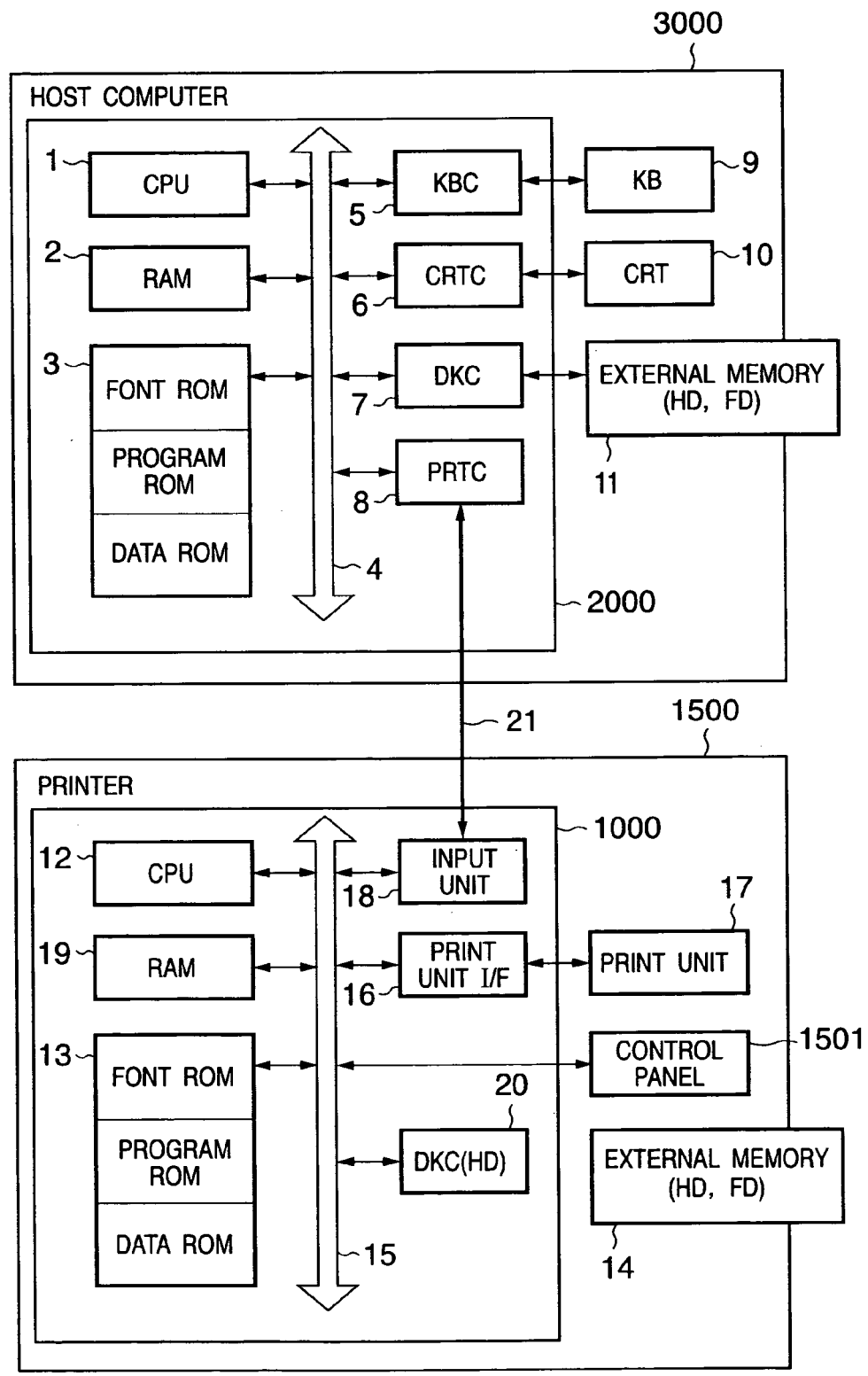
FIG. 1 is a block diagram for explaining the arrangement of a print control apparatus according to an embodiment of the present invention.

FIG. 1 is a block diagram for explaining the arrangement of a printer control system according to an embodiment of the present invention. This system includes a host computer 3000 and printer 1500. These apparatuses may be connected directly or via a network. Note that the present invention can be applied to any of a standalone apparatus as a combination of these host computer and printer, and a system including other devices (scanner and the like) as long as the functions of the present invention can be implemented. Also the present invention can be applied to a system including a plurality of apparatuses which are connected via a network such as a LAN, WAN, or the like.

Referring to FIG. 1, the host computer 3000 comprises a CPU 1 which executes a document process including graphic data, image data, text data, and table data (including spreadsheet data or the like) together on the basis of a document processing program and the like stored in a program ROM of a ROM 3 or an external memory 11. The CPU 1 systematically controls devices connected to a system bus 4. The program ROM of the ROM 3 or the external memory 11 stores an operating system program (to be referred to as an OS hereinafter) and the like as a control program of the CPU 1. A font ROM of the ROM 3 or the external memory 11 stores font data and the like used in the document process. A data ROM of the ROM 3 or the external memory 11 stores various data used upon executing the document process and the like. A RAM 2 serves as a main memory, work area, and the like of the CPU 1.

A keyboard controller (KBC) 5 controls key inputs from a keyboard 9 and a pointing device (not shown). A CRT controller (CRTC) 6 controls display on a CRT display (CRT) 10. A disk controller (DKC) 7 controls access to the external memory 11 such as a hard disk (HD), floppy disk (FD), and the like, which stores a boot program, various applications, font data, user files, edit files, a printer control command generation program (to be referred to as a printer driver hereinafter), and the like. A printer controller (PRTC) 8 is connected to the printer 1500 via a two-way interface (interface) 21, and executes a communication control process with the printer 1500.

Note that the CPU 1 executes an outline font rasterize process onto a display information RAM assured on, e.g., the RAM 2, thus allowing WYSIWYG on the CRT 10. Also, the CPU 1 opens various registered windows on the basis of commands designated by a mouse cursor (not shown) or the like on the CRT 10, and executes various data processes. Upon executing a print process, the user opens a window that pertains to print setups, and can make setups of a print process method for the printer driver, which includes printer setups and print mode selection.

The printer 1500 is controlled by a CPU 12. The printer CPU 12 outputs an image signal as output information to a print unit (printer engine) 17 connected to a system bus 15 on the basis of a control program and the like stored in a program ROM of a ROM 13 or a control program and the like stored in an external memory 14. The program ROM of the ROM 13 stores a control program and the like of the CPU 12. A font ROM of the ROM 13 stores font data and the like used upon generating the output information. A data ROM of the ROM 13 stores information and the like used on the host computer in case of a printer which does not have any external memory 14 such as a hard disk or the like.

The CPU 12 can execute a communication process with the host computer via an input unit 18, and can inform the host computer 3000 of information in the printer and the like. A RAM 19 serves as a main memory, work area, and the like of the CPU 12, and its memory size can be expanded by an option RAM connected to an expansion port (not shown). Note that the RAM 19 is used as an output information rasterize area, environment data storage area, NVRAM, and the like. A memory controller (MC) 20 controls access to the external memory 14 such as a hard disk (HD), IC card, or the like. The external memory 14 is connected as an option, and stores font data, an emulation program, form data, and the like. Reference numeral 1501 denotes a control panel on which operation switches, LED indicators, and the like are arranged.

The number of external memories 14 is not limited to one, and a plurality of external memories 14 may be connected. That is, option cards and external memories that store programs used to interpret printer control languages of different language systems in addition to internal font data may be connected. Furthermore, an NVRAM (not shown) may be connected, and may store printer mode setup information from the control panel 1501.

<Mechanism of Laser Beam Printer>

Figure 4:
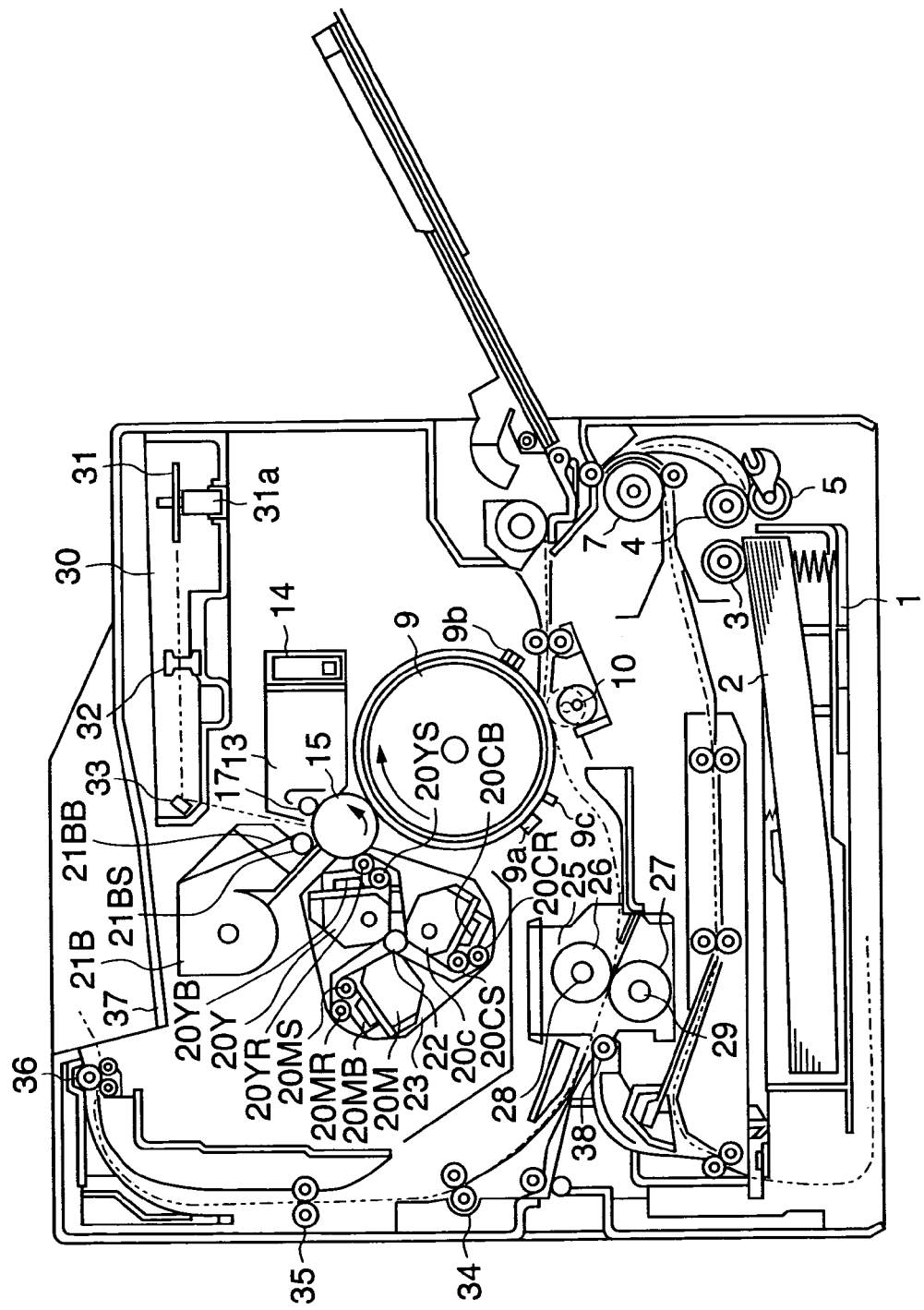
FIG. 4 is a sectional view for explaining a printer in the present invention.

FIG. 4 is a sectional view of a color laser printer with a 2-sided print function as an example of the printer 1500.

This printer forms an electrostatic latent image by scanning the surface of a photosensitive drum 15 with a laser beam modulated by image data of each color obtained based on print data input from the host computer 3000 by a polygonal mirror 31. The electrostatic latent image is developed by toner to obtain a visible image, and visible images of all colors are transferred in turn onto an intermediate transfer drum 9 to form a color visible image. The color visible image is transferred onto a transfer medium 2, thus fixing the color visible image on the transfer medium 2. An image forming unit that makes the aforementioned control comprises a drum unit 13 having the photosensitive drum 15, a primary charger having a contact charging roller 17, a cleaning unit, a developing unit, the intermediate transfer drum 9, a paper feed unit including a paper cassette 1 and various rollers 3, 4, 5, and 7, a transfer unit including a transfer roller 10, and a fixing unit 25.

The drum unit 13 integrates the photosensitive drum (photosensitive body) 15 and a cleaner container 14 which has a cleaning mechanism that also serves as a holder of the photosensitive drum 15. The drum unit 13 is detachably supported on a printer main body, and is easily exchanged as a unit in correspondence with the service life of the photosensitive drum 15. The photosensitive drum 15 is prepared by applying an organic photoconductor layer on the outer surface of an aluminum cylinder, and is rotatably supported by the cleaner container 14. The photosensitive drum 15 rotates upon receiving the driving force of a driving motor (not shown), and the driving motor rotates the photosensitive drum 15 counterclockwise in accordance with image forming operation. An electrostatic latent image is formed by selectively exposing the surface of the photosensitive drum 15. In a scanner unit 30, a modulated laser beam is reflected by the polygonal mirror which rotates by a motor 31a in synchronism with the horizontal sync signal of an image signal, and strikes the photosensitive drum via a lens 32 and reflection mirror 33.

The developing unit comprises three color developers 20Y, 20M, and 20C for developing yellow (Y), magenta (M), and cyan (C) images, and a single black developer 21B for developing a black (B) image. The color developers 20Y, 20M, and 20C and the black developer 21B respectively have sleeves 20YS, 20MS, 20CS, and 21BS, and coating blades 20YB, 20MB, 20CB, and 21BB which are in press contact with the outer surfaces of these sleeves 20YS, 20MS, 20CS, and 21BS. Also, the three color developers 20Y, 20M, and 20C respectively have coating rollers 20YR, 20MR, and 20CR.

The black developer 21B is detachably attached to the printer main body, and the color developers 20Y, 20M, and 20C are detachably attached to a developing rotary 23 which rotates about a rotation shaft 22.

The sleeve 21BS of the black developer 21B is set to have a gap as small as, e.g., 300 μm with respect to the photosensitive drum 15. In the black developer 21B, toner is fed by a feed member built in the developer, and is applied by the coating blade 21BB to the outer surface of the sleeve 21BS which rotates clockwise, thus charging the toner by triboelectrification. By applying a developing bias to the sleeve 21BS, the photosensitive drum 15 undergoes development in accordance with an electrostatic latent image, thus forming a visible image on the photosensitive drum 15 by black toner.

The three color developers 20Y, 20M, and 20C rotate upon rotation of the developing rotary 23 in image formation, and a predetermined one of the sleeves 20YS, 20MS, and 20CS faces the photosensitive drum 15 to have a gap as small as 300 μm. In this manner, a predetermined one of the color developers 20Y, 20M, and 20C stops at the developing position where it faces the photosensitive drum 15, thus forming a visible image on the photosensitive drum 15.

Upon forming a color image, the developing rotary 23 rotates once per rotation of the intermediate transfer drum 9 to execute developing processes in the order of the yellow developer 20Y, magenta developer 20M, cyan developer 20C, and black developer 21B. After four rotations of the intermediate transfer drum 9, visible images are formed in turn by yellow, magenta, cyan, and black toners, thus forming a full-color visible image on the intermediate transfer drum 9.

The intermediate transfer drum 9 contacts the photosensitive drum 15 and rotates upon rotation of the photosensitive drum 15. The drum 9 rotates clockwise upon forming a color image, and four visible images are transferred in turn onto the drum 9 from the photosensitive drum 15. The transfer roller 10 (to be described later) contacts the intermediate transfer drum 9 upon forming an image, and clamps and conveys a transfer medium 2, thus simultaneously transferring a color visible image on the intermediate transfer roller 9 onto the transfer medium 2. A TOP sensor 9a and RS sensor 9b for detecting the position of the intermediate transfer drum 9 in its rotational direction, and a density sensor 9c for detecting the density of the toner image transferred onto the intermediate transfer drum are arranged around the intermediate transfer drum.

The transfer roller 10 comprises a transfer charger which is supported to be movable toward or away from the photosensitive drum 15, and is prepared by winding a middle-resistance foamed elastic member around a metal shaft.

The transfer roller 10 is located at its lower position, as indicated by the solid line in FIG. 4, so as not to disturb color visible images, while color visible images are transferred in turn onto the intermediate transfer drum 9. After the four color visible images are formed on the intermediate transfer drum 9, the transfer roller 10 moves to its upper position indicated by the dotted line in FIG. 4 by a cam member (not shown) in synchronism with the transfer timing of the formed full-color visible image onto the transfer medium 2. In this manner, the transfer roller 10 is brought into press contact with the intermediate transfer drum 9 at a predetermined pressure via the transfer medium 2, and is applied with a bias voltage, thus transferring the full-color visible image on the intermediate transfer drum 9 onto the transfer medium 2.

The fixing unit 25 fixes the transferred full-color visible image while conveying the transfer medium 2, and comprises a fixing roller 26 for heating the transfer medium 2, and a pressing roller 27 for pressing the transfer medium 2 against the fixing roller 26. The fixing roller 26 and pressing roller 27 are formed into a hollow shape, and respectively incorporate heaters 28 and 29. That is, the transfer medium 2 that holds the full-color visible image is conveyed by the fixing roller 26 and pressing roller 27, and the toner image is fixed on its surface by applied heat and pressure.

After the visible image is fixed, the transfer medium 2 is exhausted onto an exhaust unit 37 via exhaust rollers 34, 35, and 36, thus ending the image forming operation.

The cleaning means cleans any residual toner on the photosensitive drum 15 and intermediate transfer drum 9, and waste toner after the toner image formed on the photosensitive drum 15 is transferred onto the intermediate transfer drum 9 or waste toner after the four color visible images formed on the intermediate transfer drum 9 are transferred onto the transfer medium 2 is stored in the cleaner container 14.

The transfer medium (print sheet) 2 which is to undergo a print process is picked up from the paper tray 1 by the roller 3, and is conveyed while being clamped between the intermediate transfer roller 9 and transfer roller 10 to print a color toner image on it. The toner image is fixed when the transfer medium 2 passes through the fixing unit 25. A guide 38 forms a convey path to guide the print sheet toward the upper exhaust unit in a 1-sided print process, but forms a path to guide it to a lower 2-side unit in a 2-sided print process.

The print sheet guided to the 2-side unit is temporarily fed to a portion (a convey path indicated by the two-dashed chain line) below the tray 1 by convey rollers 40, is then conveyed in the reverse direction, and is fed to a 2-side tray 39. On the 2-side tray 39, the paper sheet is reversed to that placed on the paper tray 1, and its convey direction is reversed. In this state, a toner image is transferred and fixed again, thus achieving the 2-sided print process.

<Schematic Software Configuration of Host Computer>

Figure 2:
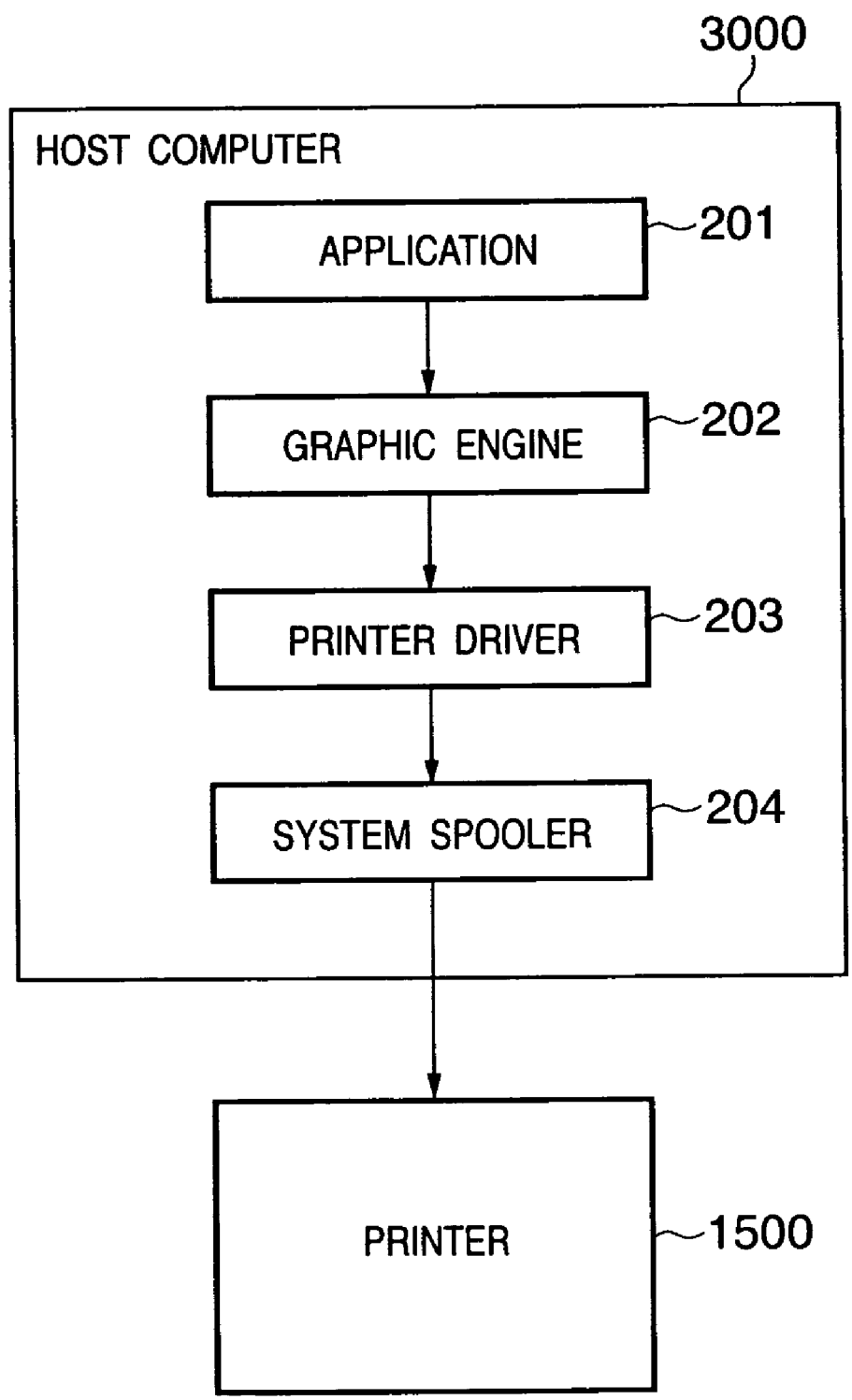
FIG. 2 is a block diagram showing the arrangement a typical print system of a host computer to which a printer is connected.

FIG. 2 is a diagram showing the schematic software module configuration in the host computer 3000. An application 201, graphic engine 202, printer driver 203, and system spooler 204 are program modules, which are present as files saved in the external memory 11, and are loaded onto the RAM 2 by the OS or other modules that exploit those modules when they are executed. The application 201 and printer driver 203 can be added to the HD of the external memory 11 via the FD of the external memory 11, a CD-ROM (not shown), or a network (not shown). The application 201 saved in the external memory 11 is loaded onto the RAM 2 upon execution. When this application 201 issues a print command to the printer 1500, an output (rendering) process is executed using the graphic engine 202 which is similarly loaded onto the RAM 2 and is ready to execute.

The graphic engine 202 loads the printer driver 203 prepared for each printing apparatus from the external memory 11 onto the RAM 2, and sets an output from the application 201 in the printer driver 203. The graphic engine 202 converts a GDI (Graphic Device Interface) function received from the application 201 into a DDI (Device Driver Interface) function, and outputs the DDI function to the printer driver 203. The printer driver 203 converts the DDI function received from the graphic engine 202 into a control command that the printer can interpret, e.g., PDL (Page Description Language) data. The converted printer control command is output as print data to the printer 1500 via the system spooler 204 loaded onto the RAM 2 by the OS and the interface 21.

<Detailed Software Configuration of Host Computer>

Figure 3:
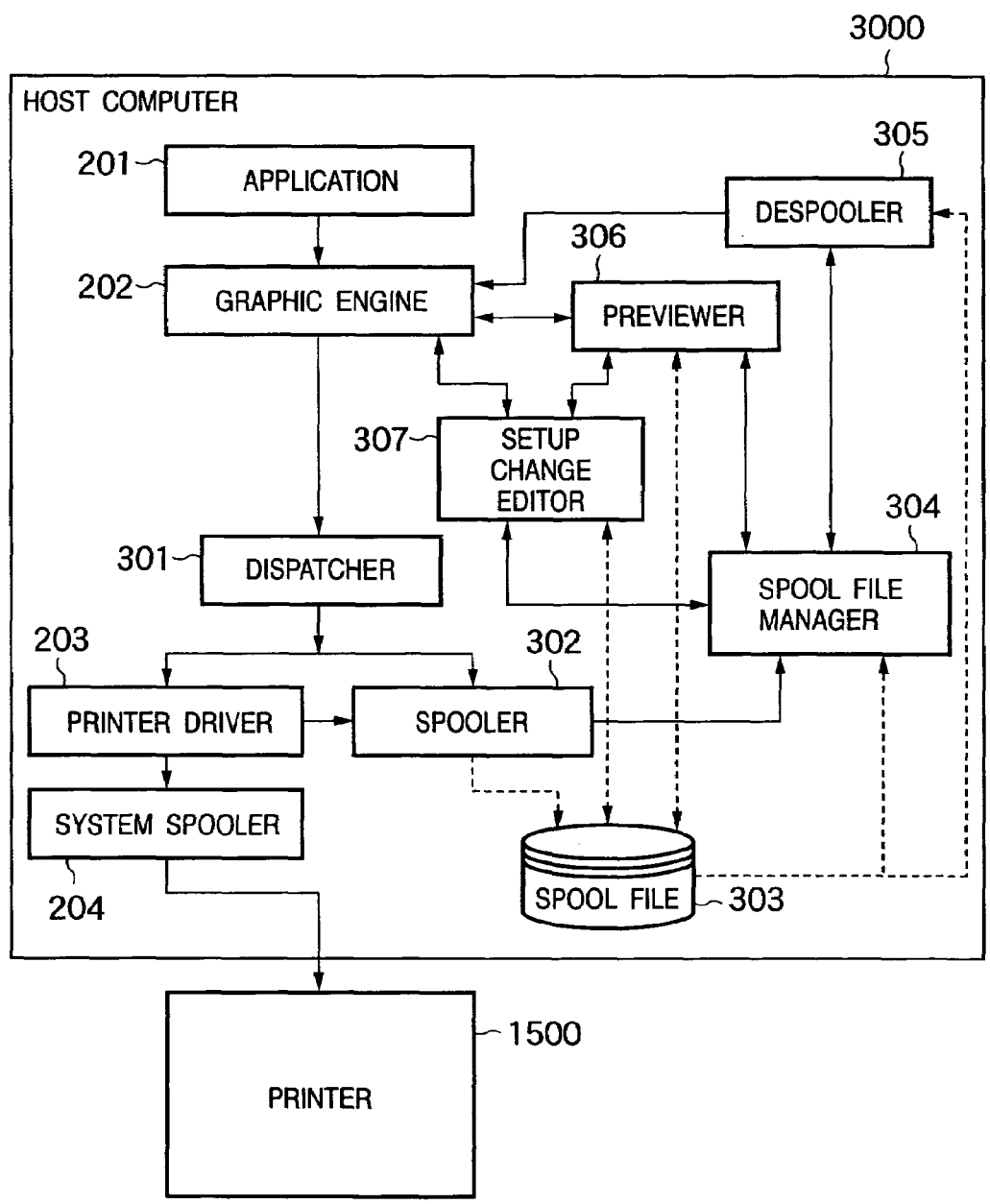
FIG. 3 is a block diagram showing the arrangement of a print system which temporarily spools a print command from an application as an intermediate code before the print command is converted into a printer control command.

FIG. 3 is a diagram showing the detailed software configuration of the host computer 3000 according to this embodiment. As shown in FIG. 3, the host computer 3000 has an arrangement for temporarily spooling print data from the application 201 as intermediate code data. That is, upon sending a print command from the graphic engine 202 to the printer driver 203, a spool file 303 of intermediate code data is generated.

In this system, the application 201 is released from the print process when a spooler 302 has converted all print commands into intermediate code data, and output them to the spool file 303, in place of the timing when the printer driver 203 has converted all print commands from the graphic engine 202 into control commands of the printer. Therefore, the application 201 is released from the print process for a shorter period of time. Also, in the system shown in FIG. 3, the contents of the spool file 303 can be processed. As a result, functions such as an enlargement/reduction function, a function of printing a plurality of pages on one page in a reduced scale, and the like, that the application does not have can be implemented for print data from the application. In order to process print data, the user makes setups from a window provided by the printer driver 203, which saves the setup contents on the RAM 2 or external memory 11.

Processes to be executed by the modules shown in FIG. 3 will be explained in detail below.

A DDI function as a print command from the graphic engine 202 is received by a dispatcher 301. If the print command (DDI function) received from the graphic engine 202 is based on a print command (GDI function) issued from the application 201 to the graphic engine 202, the dispatcher 301 loads the spooler 302 stored in the external memory 11 onto the RAM 2, and sends the print command (DDI function) to the spooler 302 in place of the printer driver 203.

The spooler 302 interprets the received print command, converts it into intermediate code data for each page, and outputs that code data to the spool file 303. The spool file of intermediate code data stored for each page will be referred to as a page description file (PDF) hereinafter. Also, the spooler 302 acquires process setups (Nup, 2-sided print, staple, color/monochrome designation, etc.) associated with print data, which are set in the printer driver 203, from the printer driver 203, and saves them as a file for each job in the spool file 303. The setup file set for each job will be referred to as a job description file (to be also referred to as a spool description file; SDF) hereinafter. This job description file will be described later. Note that the spool file 303 is generated as a file on the external memory 11, but may be generated on the RAM 2. Furthermore, the spooler 302 loads a spool file manager 304 stored on the external memory 11 onto the RAM 2, and informs the spool file manager 304 of the generation state of the spool file 303. After that, the spool file manager 304 checks based on the process setup contents saved in the spool file 303 if a print process can be executed.

When the spool file manager 304 determines that the print process can be executed using the graphic engine 202, it loads a despooler 305 stored in the external memory 11 onto the RAM 2, and instructs the despooler 305 to execute a print process of the page description file of intermediate code data described in the spool file 303.

The despooler 305 processes the page description file of intermediate code data contained in the spool file 303 in accordance with the job description file including process setup information contained in the spool file 303 to re-generate a GDI function, and outputs the GDI function via the graphic engine 202 again.

If the print command (DDI function) received from the graphic engine 202 is based on a print command (GDI function) issued from the despooler 305 to the graphic engine 202, the dispatcher 301 sends a print command to the printer driver 203 in place of the spooler 302.

The printer driver 203 generates a printer control command described in a page description language or the like on the basis of the DDI function acquired from the graphic engine 202, and outputs it to the printer 1500 via the system spooler 204.

The host computer 3000 of this embodiment comprises a previewer 306 and setup change editor 307, and can execute a preview process, a print setup change process, and a combine process of a plurality of jobs.

Figure 9:
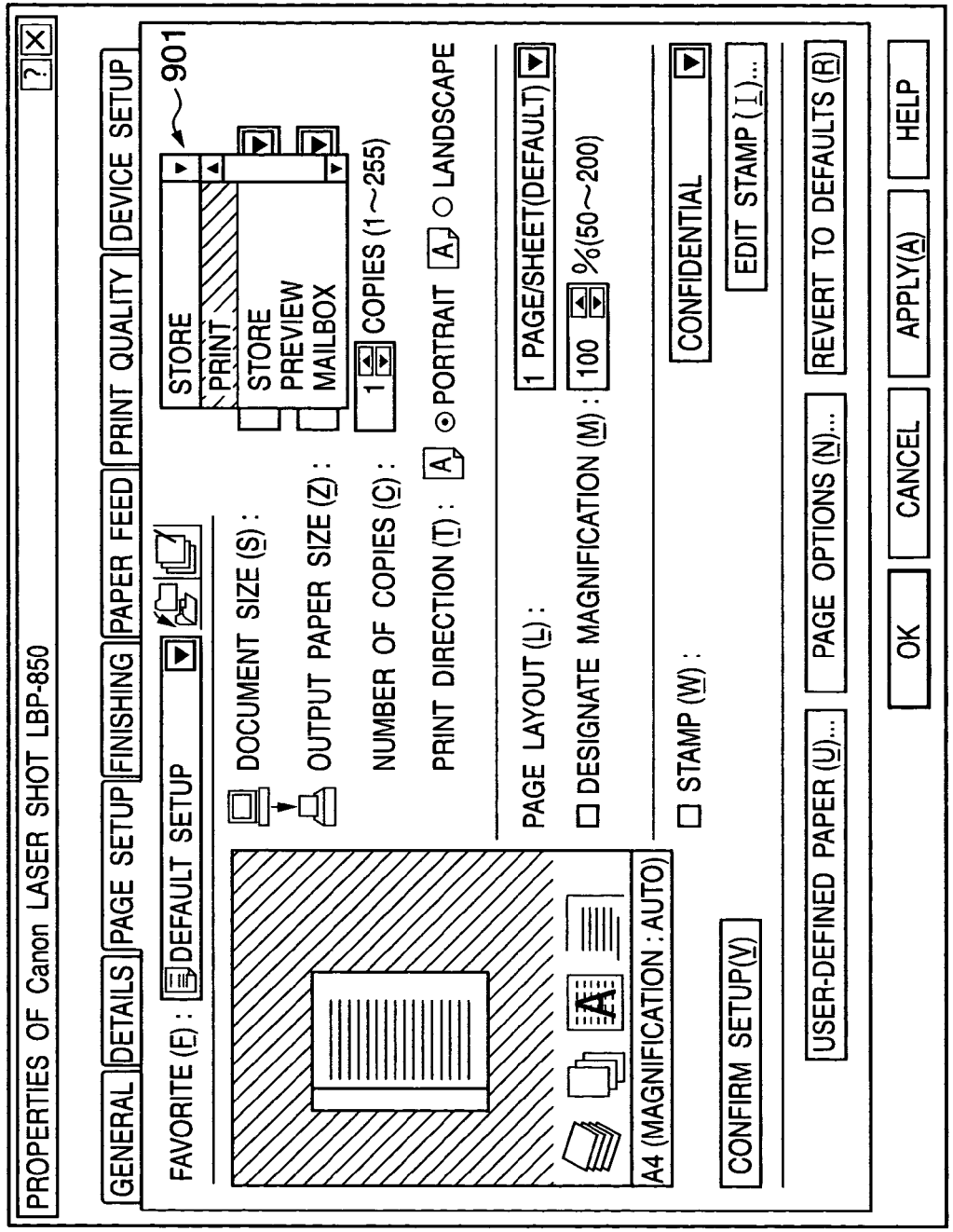
FIG. 9 shows an example of a print spool setting window.

Note that the printer driver 203 includes a program module used to display a property dialog that allows the user to make printer setups. When the user launches that property setup module via the OS, a dialog shown in FIG. 9 is displayed. In order to execute the preview process, print setup change process, and combine process of a plurality of jobs, the user must designate "store" from a pull-down menu 901 as means for "designating an output destination. When the user wants to display a preview alone, he or she can select "preview" as designation of the output destination.

The contents set on the property dialog of the printer driver in this way are stored as a setup file in a structure (called DEVMODE in a Windows®-based OS) provided by the OS. In that structure, the process setup contained in, e.g., the spool file 303 includes a setup indicating whether or not data is to be "stored" in the spool file manager 304.

When the spool file manager 304 loads the print setup via the printer driver 203 and detects "store" designation, a page description file and job description file are generated and stored in the spool file 303, as described above. At this time, a window of the spool file manager pops up, as shown in FIG. 16, and displays a list of jobs spooled by the spool file 303.

Figure 16:
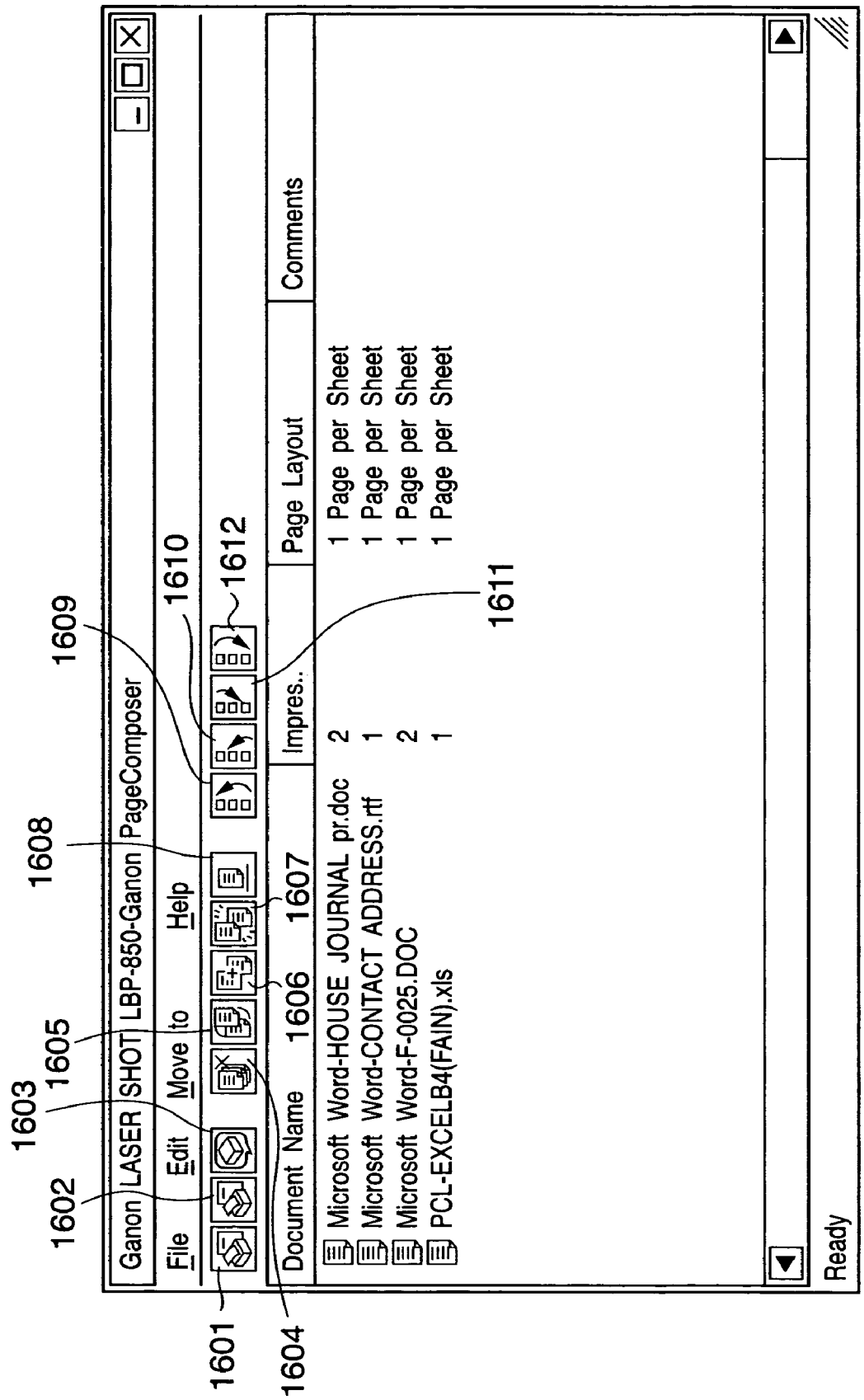
FIG. 16 shows an example of a window that displays a list of print jobs spooled by the spool file manager 304.

FIG. 16 shows an example wherein four jobs are spooled, and operations for each job can be selected from a menu bar or by pressing menu icons below the menu bar. The number of operations that can be selected from the menu bar is the same as that of the menu icons. The following 11 types of operations are available: "print" which executes a given job while selecting that job; "save & print" which executes a print process while saving a spool file of intermediate code data; "preview" which displays output preview of a job in consideration of the print setups; "delete" which deletes a spool file of intermediate code data; "copy" which generates a copy of a spool file of intermediate code data; "combine" which combines a plurality of jobs of spool files of intermediate code data into one job; "divide" which divides the combined job into a plurality of original jobs; "job edit" which changes the print setups (layout setup, finishing setup, and the like) of an independent or combined job; "move to top" which moves the print order of a given job to the top of a job list; "move up by one" which advances the print order of a given job by one; "move down by one" which delays the print order of a given job by one; and "move to last" which moves the print order of a given job to the last of a job list.

When "preview" of an independent or combined job is designated on the window (FIG. 16) of the spool file manager, the previewer 306 stored in the external memory 11 is loaded onto the RAM 2, and is instructed to execute a preview process of a job of intermediate code data described in the spool file 303.

(Previewer)

The previewer 306 can be output onto the screen by sequentially reading out page description files (PDF) of intermediate code data included in the spool file 303, processing them in accordance with the contents of process setup information included in the job description file (SDF) stored in the spool file 303, and outputting a GDI function to the graphic engine 202, which then outputs rendering data on its own client area.

The graphic engine 202 can appropriately render in correspondence with the designated output destination. The previewer 306 can be implemented by the method of processing intermediate code data included in the spool file 303 in accordance with the contents of the process setups included in the spool file 303 and outputting them using the graphic engine as in the despooler 305. In this way, since the process setups set in the printer driver are stored as a job description file in the spool file 303 and data of the page description file are processed and output based on the job description file, a print preview approximate to an actual printout can be provided to the user in correspondence with the way actual rendering data is printed, and designated processes (e.g., an Nup process (for laying out and printing N logical pages on one physical page in a reduced scale), a 2-sided print process, a booklet print process, a stamp process, and the like). Since the preview function of conventional application software such as document creation software renders based on page setups in that application, the print setups in the printer driver are not reflected in preview, and the user cannot recognize a preview of an image to be actually printed out.

Figure 17:
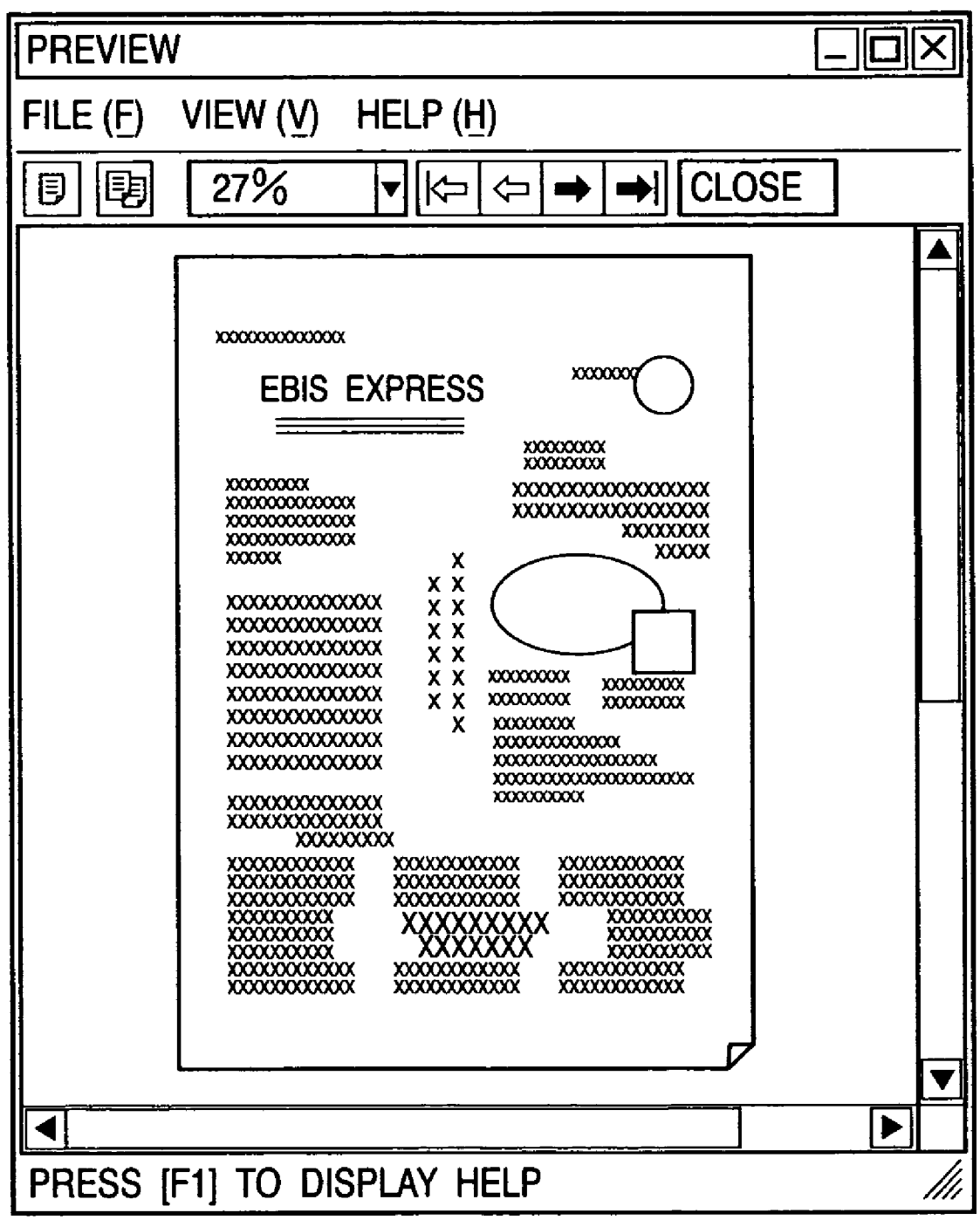
FIG. 17 shows an example of a window of a previewer 306.

By executing the preview process in this fashion, a large preview image of an image processed in accordance with the print process setups contained in the spool file 303 is displayed on the screen by the previewer 306, as shown in FIG. 17. After that, the previewer 306 is closed in response to the user's non-display instruction, and the control shifts to the window (FIG. 16) of the spool file manager.

When the user wants to print in accordance with the contents displayed by the previewer 306, he or she issues a print request by selecting "print" or "save & print" on the spool file manager 304. In response to the print request, the despooler 305 generates a GDI function by processing each page description file based on the job description file, and passes it to the graphic engine 202. Then, a print command is sent to the printer driver 203 via the dispatcher 301, thus executing the print process.

(Setup Change Editor)

A setup change process using the setup change editor 307 will be explained below.

The setup change process can be done for a "store"-designated job in FIG. 9 as in the preview process. The window of the spool file manager 304 pops up in the same flow as in the preview process, and displays a list of spooled jobs. When a setup change instruction is issued by designating "job edit" on the window (FIG. 16) of the spool file manager, the setup change editor 307 stored in the external memory 11 is loaded onto the RAM 2 and is instructed to display current or default process setups. Then, a job setup window shown in FIG. 18 is displayed.

The setup change editor 307 acquires the job description file of the "job edit"-designated job, and changes the default values of the job setup window in FIG. 18 on the basis of setup items designated in that job description file. In the example shown in FIG. 18, the job description file of the "job edit"-designated file is designated with the number of copies: 1, print method: 1-side, staple: none, layout: 1 page/sheet, and the like.

This setup change editor 307 can also make a small preview output on the window shown in FIG. 18 by processing each page description file of intermediate code data stored in the spool file 303 in accordance with the contents of the process setups included in the job description file stored in the spool file 303, and outputting them onto its own client area using the graphic engine 202.

Also, this editor can change and correct the contents of the process setups included in the job description file stored in the spool file 303. In this case, the user interface on the setup change editor 307 may have items that the printer driver 203 can set, or the user interface of the printer driver 203 itself may be called. As shown in FIG. 18, the number of copies, the print method (1-side, 2-side, booklet print), staple (saddle finisher, or the like), page layout, layout order, and the like can be designated. Upon pressing "detailed setups", most of items that the printer driver can designate can be re-set. However, changes of setups that pertain to print quality such as the resolution, graphic mode, and the like are not permitted.

The changed items are confirmed in accordance with a confirmation request on the setup change editor 307, and the control shifts to the spool file manager 304. The confirmed print setups that have been changed are saved. In this case, the setups are not saved in an original job description file, but a new job output description file used in the job edit process or the like is created to save the setups.

If the user wants to print in accordance with the changed setup contents as in confirmation on the previewer 306, he or she issues a print request on the window of the spool file manager 304. The print request is sent to the graphic engine 202, and a print command is sent to the printer driver 203 via the dispatcher 301, thus executing the print process.

On the window (FIG. 16) of the spool file manager, the user can designate to combine a plurality of print jobs to execute them as a single print job. This process is also premised on the "store"-designated job on the property dialog of the printer driver shown in FIG. 9 as in the preview and setup change processes.

When the user wants to combine print jobs, he or she calls the printer driver 203 from the application 201, and selects "store" from the user interface shown in FIG. 9. With this selection, the print job is stored in the spool file 303 as in the above description, and the window (FIG. 16) of the spool file manager pops up, as shown in FIG. 16. The spooled job is displayed as a list on the window of the spool file manager. By repeating the same operation from the application 201, a list of a plurality of jobs is displayed on the window of the spool file manager 304.

When the user selects a plurality of jobs and designates "combine", the setup change editor 307 stored in the external memory 11 is loaded onto the RAM 2 and is instructed to display the process setups of the first job on the list or default setups. Then, a combine setup window shown in FIG. 18 is displayed. In this embodiment, the window of the setup change editor 307 is used as the combine setup window, but a window of another module may be used.

The setup change editor 307 processes each page description file of intermediate code data included in the spool file 303 in accordance with the contents of the process setups included in job setup information stored in the spool file 303, and outputs the processed data for all jobs designated as the combined job to its own client area using the graphic engine 202, thus outputting these jobs on the screen. In this case, small preview images of all the selected jobs can be displayed on the preview region shown in FIG. 18. Upon generating the combined job, a job output description file that expands the job description files of the individual jobs is generated. This job output description file is also generated in the job edit process. That is, one job output description file is generated for each job and also for the combined job.

In this case, images of the individual jobs may be displayed using the process setups before they are combined, or may be displayed by changing and correcting their setups to common process setups of the combined job. In this case, the user interface on the setup change editor 307 may have items that the printer driver 203 can set, or the user interface of the printer driver 203 itself may be called.

When the combined job and changed items are confirmed in accordance with a confirmation request on the setup change editor 307, as described above, the control shifts to the spool file manager 304. With these operations, the plurality of jobs selected previously are displayed as a single combined job on the window of the spool file manager.

When the user wants to print in accordance with the changed setup contents as in confirmation on the previewer 306, he or she issues a print request on the window of the spool file manager 304. The print request is sent to the graphic engine 202, and a print command is sent to the printer driver 203 via the dispatcher 301, thus executing the print process.

<Save Process of Print Intermediate Data>

Figure 5:
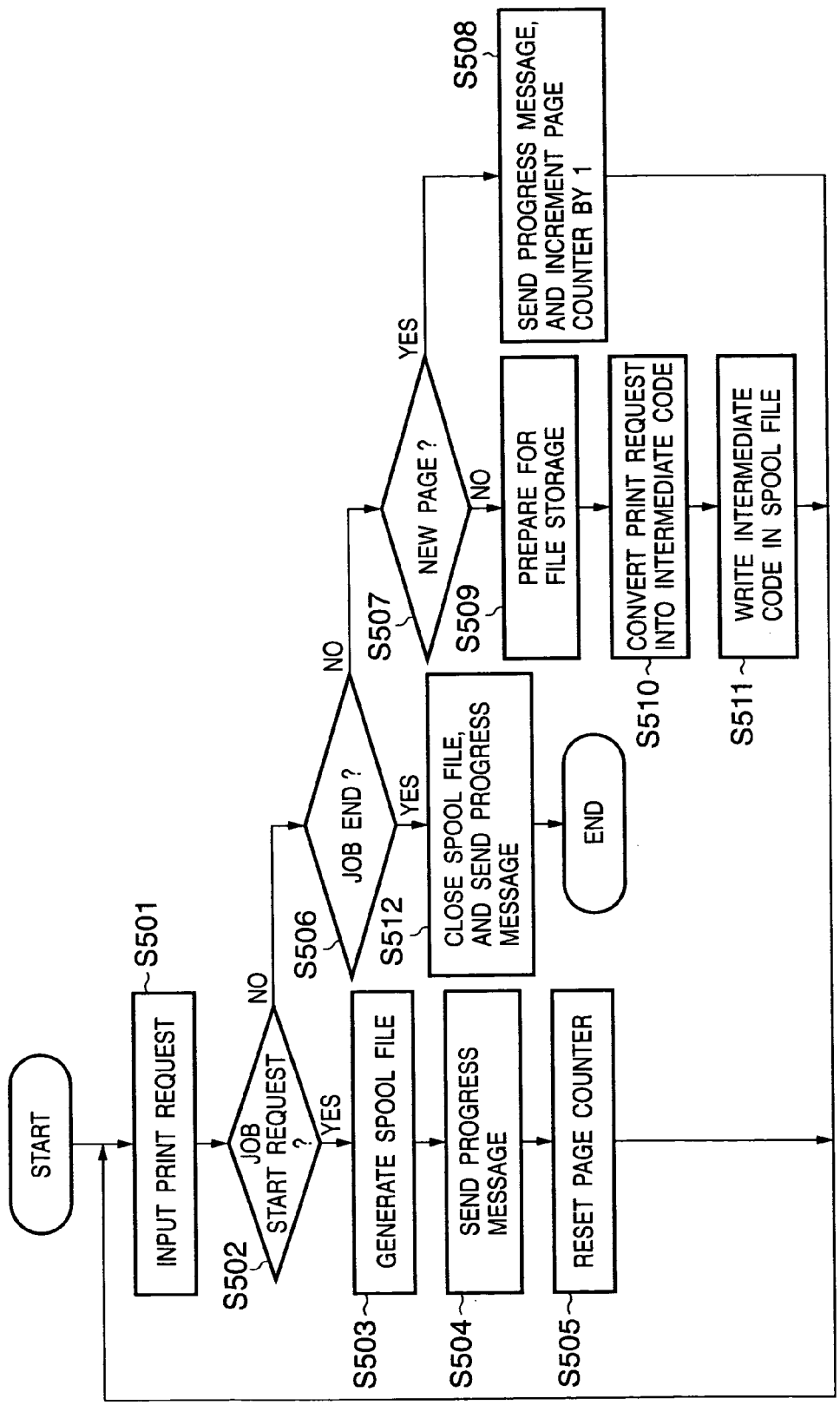
FIG. 5 is a flow chart showing the process in a spooler 302.

FIG. 5 is a flow chart showing the process in a save step for each page upon generating the spool file 303 in the spooler 302.

Figure 8:
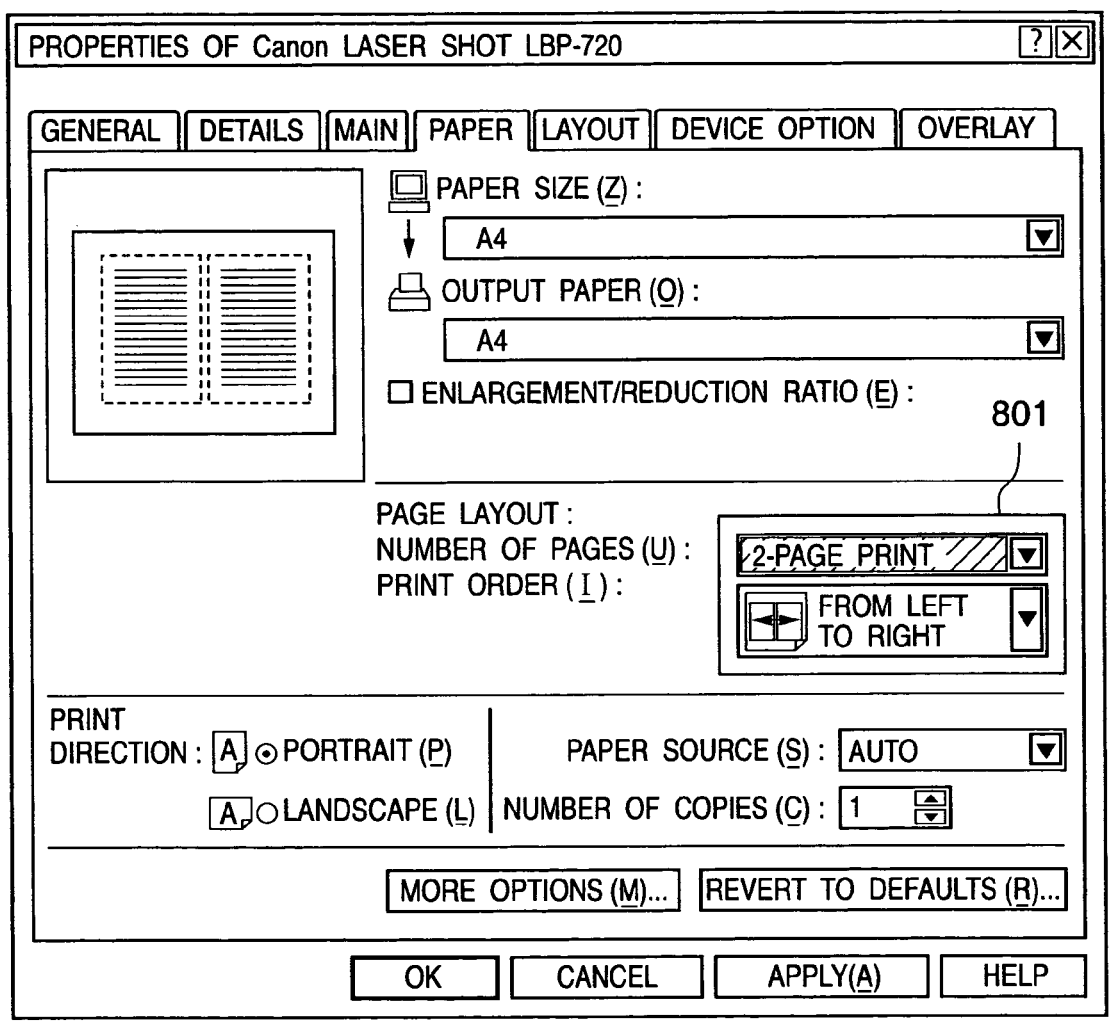
FIG. 8 shows an example of a print setting window.

In step S501, the spooler 302 accepts a print request from the application via the graphic engine 202. The application displays a dialog used to input print setups, as shown in FIG. 8, and the printer driver 203 passes the print setups input using this dialog to the spooler 303. The setup input dialog shown in FIG. 8 includes a setup item 801 which is used to determine the number of logical pages to be laid out per physical page, and the like.

The spooler 302 determines in step S502 whether or not the accepted print request is a job start request. If it is determined in step S502 that the accepted print request is a job start request, the flow advances to step S503, and the spooler 302 generates a spool file 303 used to temporarily save intermediate data. The spooler 302 informs the spool file manager 304 of the progress of the print process in step S504, and resets its page counter to 1 in step S505. Note that the spool file manager 304 loads and stores job information, process setups, and the like for a job, the print process of which has started, from the spool file 303.

On the other hand, if it is determined in step S502 that the accepted print request is not a job start request, the flow advances to step S506.

The spooler 302 determines in step S506 whether or not the accepted request is a job end request. If it is determined in step S506 that the accepted request is not a job end request, the flow advances to step S507 to check if the accepted request is a new page request. If it is determined in step S507 that the accepted request is a new page request, the flow advances to step S508, and the spooler 302 informs the spool file manager 304 of the progress of the print process. The spooler 302 then increments the page counter, closes a page description file that stores the intermediate code data, and generates the next page description file.

If it is determined in step S507 that the accepted print request is not a new page request, the flow advances to step S509, and the spooler 302 prepares to save intermediate code data in the page description file.

In order to store the print request in the spool file 303, the spooler 302 converts the DDI function of the print request into an intermediate code in step S510. In step S511, the spooler 302 writes the print request (intermediate code data) that has been converted into a storable format in step S510 in the page description file of the spool file 303. After that, the flow returns to step S501 to accept the next print request from the application. The spooler 302 repeats a series of processes from step S501 to step S511 until it receives a job end request (End Doc) from the application. At the same time, the spooler 302 acquires information such as process setups and the like stored in a DEVMODE structure from the printer driver 203, and stores the acquired information in the spool file 303 as a job description file. If it is determined in step S506 that the print request from the application is a job end request, since all print requests from the application are complete, the flow advances to step S512 to inform the spool file manager 304 of the progress of the print process, thus ending the process.

<Generation of Spool File>

Figure 6:
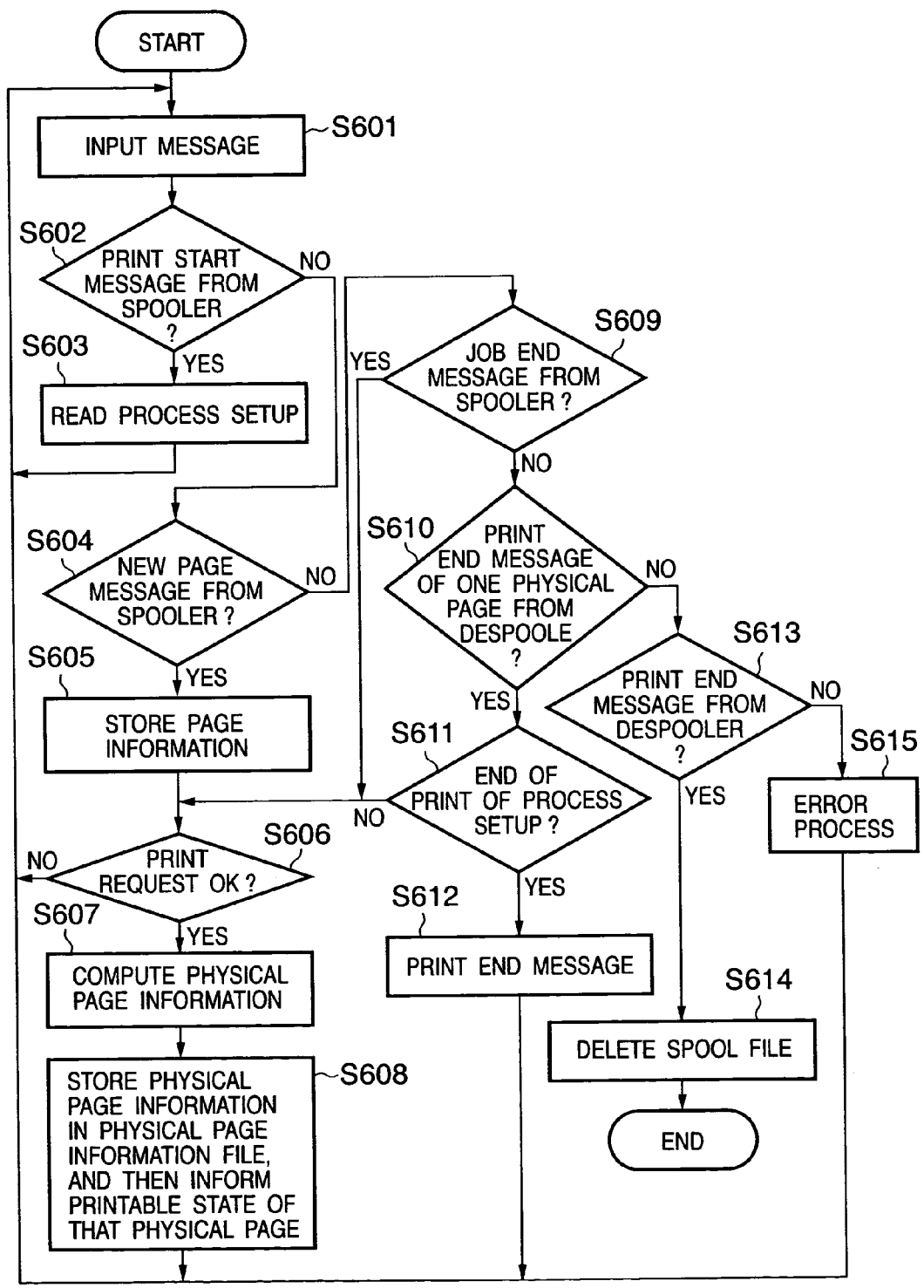
FIG. 6 is a flow chart showing the print control in a spool file manager 304.

FIG. 6 is a flow chart showing details of the control between the generation process of the spool file 303 and that of print data (to be described later) in the spool file manager 304.

In step S601, the spool file manager 304 accepts the progress message of the print process from the spooler 302 or despooler 305.

The spool file manager 304 checks in step S602 if the progress message is a print start message sent from the spooler 302 in step S504 above. If YES in step S602, the flow advances to step S603, and the spool file manager 304 reads the print process setups from the spool file 303 to start job management. On the other hand, if the spool file manager 304 determines in step S602 that the progress message is not a print start message from the spooler 302, the flow jumps to step S604 to check if the progress message is a print end message of one logical page sent from the spooler 302 in step S508 above. If YES in step S604, the flow advances to step S605, and the spool file manager 304 stores logical page information for that logical page. The spool file manager 304 then checks in step S606 if a print process of one physical page for n logical pages which have been spooled at that time can be started. If YES in step S606, the flow advances to step S607 to determine a physical page number on the basis of the number of logical pages assigned to one physical page to be printed.

As for calculation of physical pages, for example, when the process setups designate to lay out four logical pages per physical page, the first physical page is ready to print when the fourth logical page has been spooled, and the first physical page is determined at that time. Subsequently, the second physical page is ready to print when the eighth logical page has been spooled.

Even when the total number of logical pages is not a multiple of the number of logical pages to be laid out per physical page, logical pages to be laid out per physical page can be determined by the spool end message in step 512.

In step S608, the spool file manager 304 saves information such as a logical page number which forms a physical page which is ready to print in the format shown in FIG. 10, its physical page number, and the like in a job output description file (a file containing physical page information), and informs the despooler 305 that the physical page information for one physical page is added. The flow then returns to step S601 to wait for the next message. In this embodiment, when print data for one page, i.e., a logical page or pages which forms or form one physical page has or have been spooled, a print process can be started even when spooling of all print jobs is not complete.

On the other hand, if it is determined in step S604 that the progress message is not a print end message of one logical page from the spooler 302, the flow advances to step S609, and the spool file manager 304 checks if the progress message is a job end message sent from the spooler 302 in step S512 above. If YES in step S609, the flow advances to step S606 above; otherwise, the flow advances to step S610, and the spool file manager 304 checks if the received message is a print end message of one physical page from the despooler 305. If it is determined in step S610 that the progress message is a print end message of one physical page, the flow advances to step S612 to check if a print process for all pages designated by the process setups is complete. If YES in step S612, the flow advances to step S613, and the spool file manager 304 informs the despooler 305 of the end of the print process. On the other hand, if pages to be printed designated by the process setups still remain, the flow advances to step S606 above. The despooler 305 of this embodiment assumes one physical page as a unit of a print process to be executed. In step S608, information required to execute a print process of one physical page is sequentially saved in a file in a re-usable format. If such information need not be re-used, information for one physical page is overwritten in turn on a high-speed medium such as a shared memory, thus saving the time and resources. If the progress of spooling is faster than that of despooling, or if despooling starts after completion of spooling of all pages, a page printable message is not sent for each physical page in step S608, and a message indicating that a plurality of or all physical pages are ready to print may be sent in accordance with the progress on the despooler side, thus reducing the number of messages to be sent.

If it is determined in step S610 that the progress message is not a print end message of one physical page from the despooler 305, the flow jumps to step S613, and the spool file manager 304 checks if the progress message is a print end message from the despooler 305. If YES in step S613, the flow advances to step S614, and the spool file manager 304 deletes the corresponding page description file to end the process. On the other hand, if the progress message is not a print end message from the despooler 305, the flow advances to step S615 to execute another normal process, thus waiting for the next message.

<Output of Spool File>

Figure 7:
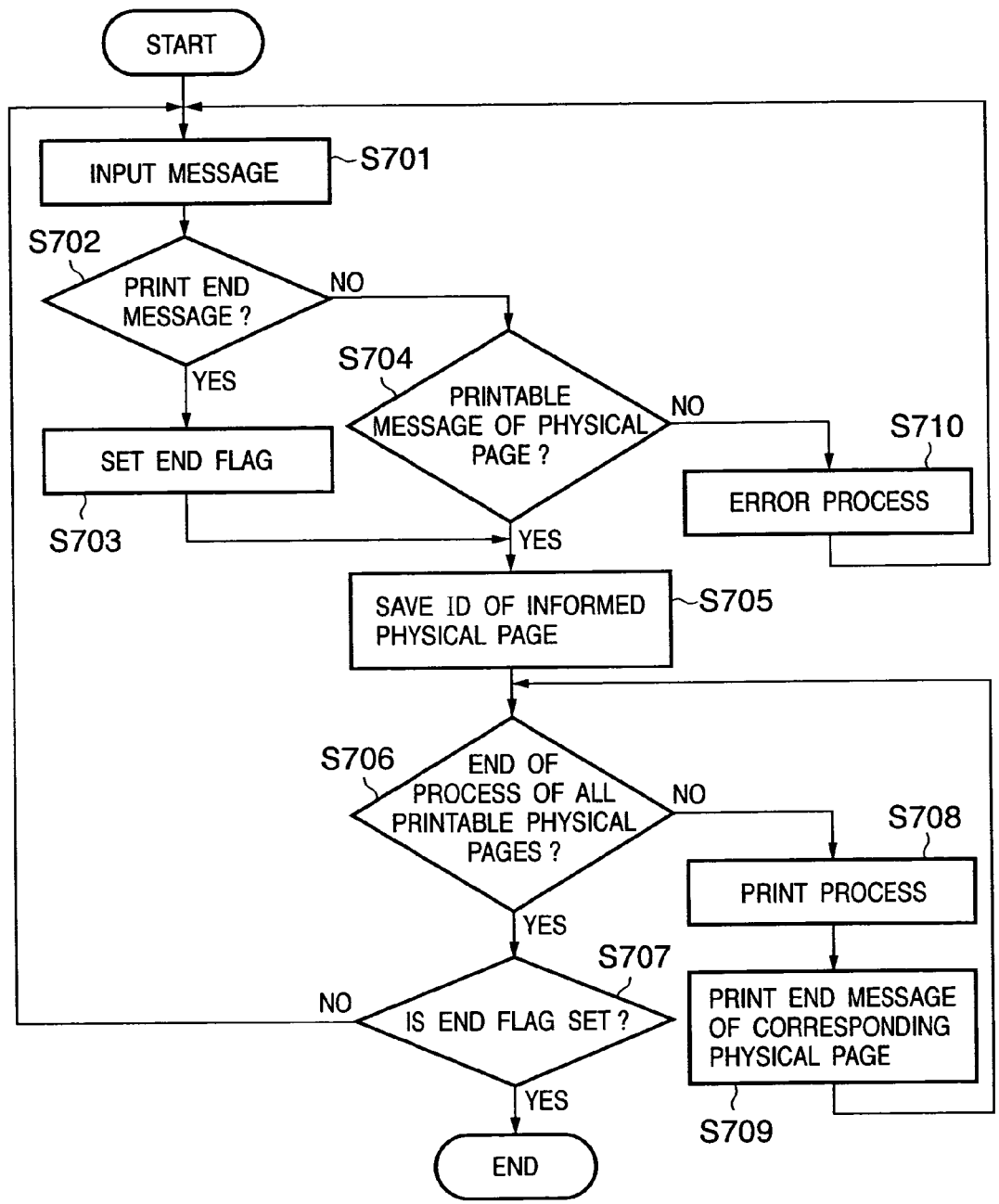
FIG. 7 is a flow chart showing the process in a despooler 305.

FIG. 7 is a flow chart showing details of the generation process of print data in the despooler 305.

The despooler 305 reads out necessary information (page description file and job description file) from the spool file 303 in response to a print request from the spool file manager 304, and generates print data. The method of transferring the generated print data to the printer has been explained using FIG. 3.

Upon generating print data, the despooler 305 receives a message from the aforementioned spool file manager 304 in step S701. The despooler 305 checks in step S702 if the received message is a job end message. If YES in step S702, the flow advances to step S703 to set an end flag, and the flow then advances to step S705. On the other hand, if it is determined in step S702 that the received message is not a job end message, the flow advances to step S704 to check if the message is a print start request of one physical page sent in step S608. If NO in step S704, the flow advances to step S710 to execute another process such as an error process. The flow then returns to step S701 to wait for the next message. If it is determined in step S704 that the message is a print start request of one physical page, the flow advances to step S705, and the despooler 305 saves the ID of a physical page that can undergo a print process and is designated by the message in step S704. The despooler 305 checks in step S706 if a print process of all pages corresponding to the physical page IDs saved in step S705 is complete. If the process for all physical pages is complete, the flow advances to step S707 to check if the end flag is set in step S703. If the end flag is set, the despooler 305 determines that the print process of the job is complete, and sends its process end message to the spool file manager 304, thus ending the process. If it is determined in step S707 that no end flag is set, the flow returns to step S701 to wait for the next message. On the other hand, if it is determined in step S706 that printable physical pages still remain, the flow advances to step S708. In step S708, the despooler 305 reads out a non-processed physical page ID from the saved physical page IDs in turn, reads information required to generate print data of a physical page corresponding to the readout physical page ID, and executes a print process. In the print process, the despooler 305 converts a print request command stored in the spool file 303 into a format (GDI function) that the graphic engine 202 can recognize, and transfers the converted command. As for process setups that designate to lay out a plurality of logical pages on one physical page (to be referred to as N-up print setups hereinafter), conversion is made in this step in consideration of a reduced-scale layout. Upon completion of the required print process, the despooler 305 sends a print data generation end message of one physical page to the spool file manger 304 in step S709. The flow then returns to step S706 to repeat the print process for all the printable physical page IDs saved in step S705.

The flow of print processes using the dispatcher 301, spooler 302, spool file manager 304, and despooler 305 has been explained. With the above processes, since the application 201 is released from the print process at the timing when the spooler 302 generates intermediate code data and stores it in the spool file 303, the processing time can be shorter than that required when the application directly outputs data to the printer driver 203. Also, since intermediate files (page description file, job description file) that consider the print setups of the printer driver are temporarily saved in the spool file 303, the user can recognize a print preview to be actually printed, and can combine and rearrange print jobs generated by a plurality of applications. Furthermore, the user can change print setups without launching the application again to print.

In the print process using the spooler 302, the despooler 305 generates a job output description file upon sending a print request to the graphic engine 202. Such job output description file is also generated when a preview is to be displayed or jobs are to be combined. The job output description file is equivalent to a job description file in case of an individual job, and is generated based on a plurality of pieces of job setup information in case of a combined job. The job output description file will be described below.

<Configuration of Job Output Description File>

FIG. 10 shows an example of a job output description file which is generated by the spool file manager 304 in step S608 and saves information that forms a printable physical page. A field 1001 stores an ID used to identify a job, and may hold a file name or the name of a shared memory that saves this information. A field 1002 stores job setup information. The job setup information contains a structure required to start a job print process with respect to the graphic engine 202, designation of N-up print setups, designation of additional rendering such as a page frame, finishing designation such as the number of copies, stapling, and the like, and so forth, i.e., information that can be set one each per job. The job setup information field 1002 saves a required number of pieces of information in correspondence with functions for a job. A field 1003 stores the number of physical pages of a job, i.e., indicates that a plurality of pieces of physical page information designated by this number are saved after this field. Since this embodiment informs the number of printable physical pages, an operation can be made without this field. After this field, a plurality of pieces of physical page information are stored from a field 1004 to the last field in correspondence with the value stored in the field 1003. Physical page information will be described later using FIG. 12.

Figure 11:
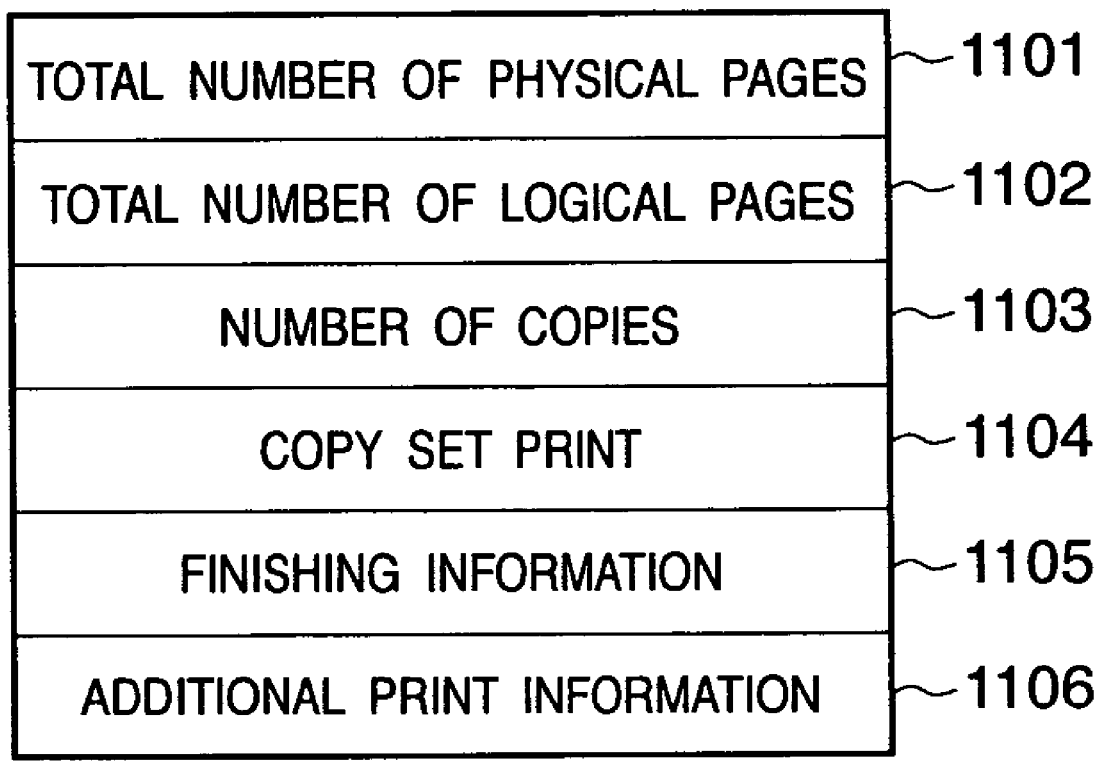
FIG. 11 shows an example of the data format to be passed upon issuing a print request of physical pages from the spool file manager 304 to the despooler 305.

FIG. 11 shows an example of the job setup information shown in the field 1002 of FIG. 10. A field 1101 stores the total number of physical pages. A field 1102 stores the total number of logical pages. The fields 1101 and 1102 are used when the number of pages and the like are to be printed as additional information of print data. When a print process continues, these fields store tentative values or the spool file manager 304 postpones generation of information of printable physical pages until completion of the print process. A field 1103 stores copy set count information which designates the number of sets of copies to be printed of this print job. A field 1104 designates whether or not a print process is to be made for each set of copies if the field 1103 sets to print a plurality of sets of copies. A field 1105 stores finishing information such as stapling, punch, Z-fold, or the like, and is designated when a finisher is available on the printer main body or externally. A field 1106 stores additional print information, i.e., saves information to be added to a job such as ornaments (e.g., page frame), additional information (e.g., date), a user name, a page count, watermark print, and the like. The number of fields included in this job setup information increases with increasing number of functions. For example, if a 2-sided print function is available, a field for saving designation of the 2-sided print function is added.

Figure 12:
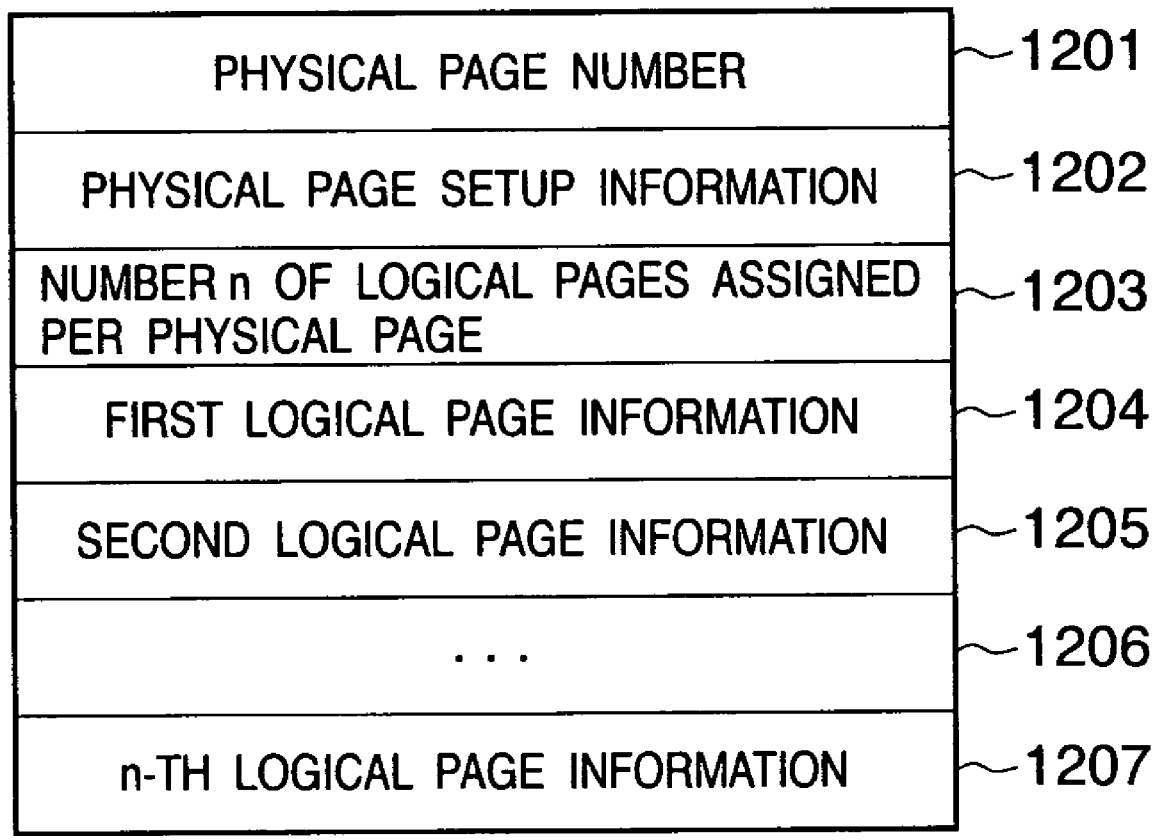
FIG. 12 shows an example of the data format to be passed upon issuing a print request of physical pages from the spool file manager 304 to the despooler 305.

FIG. 12 shows an example of physical page information shown in the field 1004 in FIG. 10. A first field 1201 stores a physical page number, which value is used upon managing the print order or additionally printing a physical page number. A field 1202 stores physical page setup information. When a layout or color/monochrome setup can be designated for each physical page, this field stores a layout or color/monochrome setup. A field 1203 stores the number of logical pages to be assigned to this physical page. When four pages are assigned to one physical page, this field saves "4" or an ID indicating a 4-page print mode. A field 1204 and subsequent fields save information of logical pages in correspondence with the number designated in the field 1203. Depending on the number of pages printed from the application 201, the number of pages designated in the field 1203 becomes often smaller than the number of actual page data. Such case is coped with by saving special data indicating a blank page in logical page information.

Figure 13:
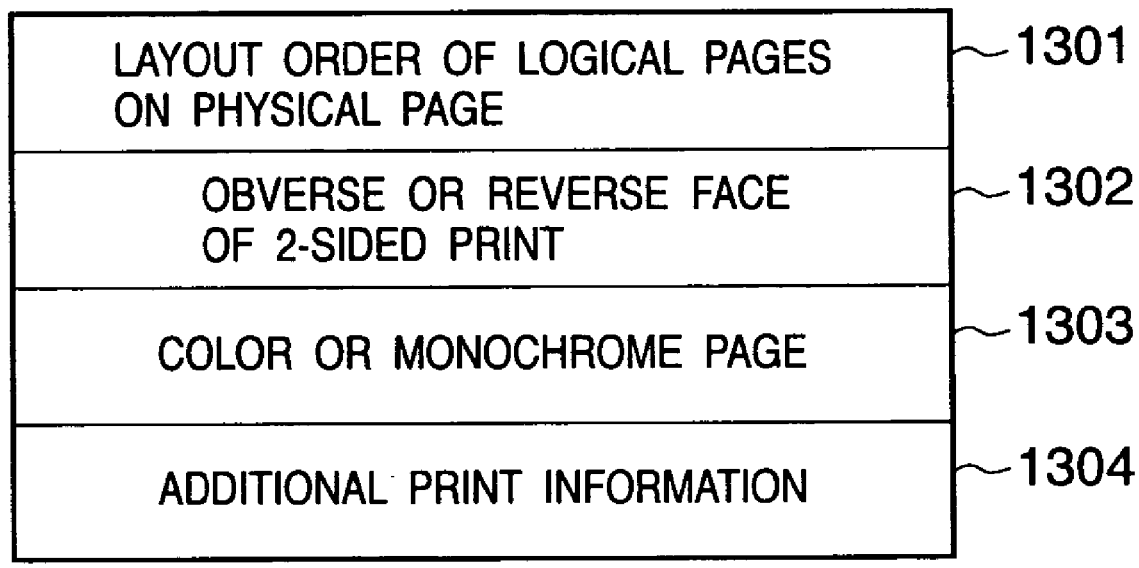
FIG. 13 shows an example of the data format to be passed upon issuing a print request of physical pages from the spool file manager 304 to the despooler 305.

FIG. 13 shows an example of physical page setup information in the field 1202. A field 1301 stores the layout order of logical pages on a physical page, i.e., saves designation of the layout order of logical pages (from upper left to right, from upper left to lower, and the like) on a physical page in the N-up print function. In some systems, such layout order field is not used, and the field 1204 and subsequent fields that store logical page information are arranged not in the order of page numbers but in a layout order, in place of the setup in the field 1301. A field 1302 stores obverse/reverse information of the 2-sided print function, and is used upon adjusting, e.g., binding margins on the obverse and reverse faces. A field 1303 stores designation indicating a color or monochrome page. If a printer has monochrome and color modes, the value in this field is used when a color page of a document which includes both color and monochrome pages is to be printed in the color mode, and a monochrome page of this document is to be printed in the monochrome mode. With this information, a color printer can change processes for respective pages as an auto color mode. That is, transfer control can be made by rotating an intermediate transfer member (intermediate transfer drum or belt) or a transfer member (transfer drum or belt) in correspondence with the number of device colors (four in case of YMCK) for a color page, and by rotating it once for black of a monochrome page. A field 1304 stores additional print information which is used upon printing additional information such as a page count, date, or the like is to be printed on a physical page. In the physical page setup information, fields are added in correspondence with system functions.

Figure 14:
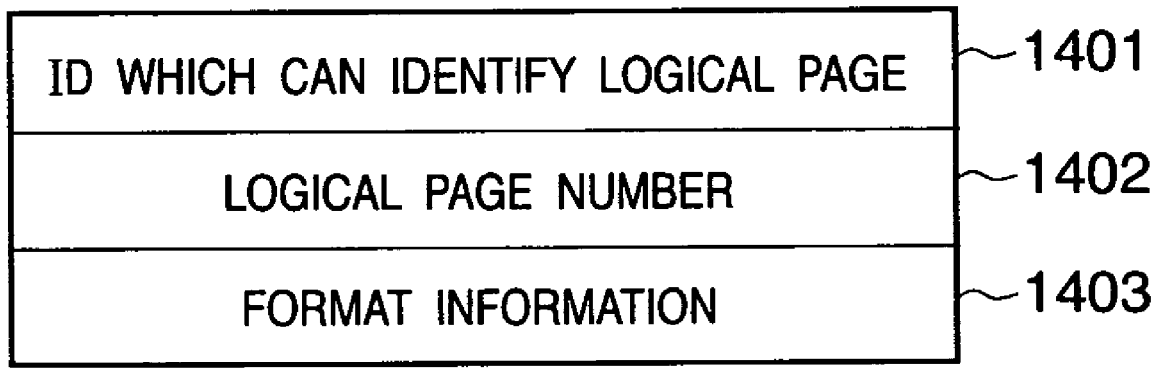
FIG. 14 shows an example of the data format to be passed upon issuing a print request of physical pages from the spool file manager 304 to the despooler 305.

FIG. 14 shows an example of logical page information in the field 1204. A field 1401 stores the ID of a logical page. Using this ID, intermediate code data of a page description file corresponding to the logical page is referred to from the spool file 303. The intermediate code data of a logical page need only be accessed using this ID, and a file or memory pointer, or the intermediate code itself that forms a logical page may be stored. A field 1402 stores a logical page number, which is used when the logical page number is printed as additional information or as auxiliary information of the logical page ID. Format information in a field 1403 saves various setup items which can be designated for each logical page. For example, additional print information such as a page frame or the like, and various kinds of setup information such as an enlargement/reduction factor and the like, which are set for each logical page, are saved. Also, attribute information for a logical page such as color/monochrome information for each logical page can be saved if necessary. Conversely, in a system which need not change setups for respective logical pages or does not require any attribute information for each logical page, the field 1403 may be omitted.

The job output description file has the aforementioned configuration. Note that a job description file has nearly the same configuration, and has a print style (1-sided, 2-sided, booklet print), print layout (Nup, poster print), additional information (addition of watermark, date, user name), the number of copies, and paper size information as a job, and also the layout order of logical pages, obverse/reverse face information of the 2-sided print function, color mode, and the like for each physical page.

In this embodiment, the setup contents of an independent job are contained in a job description file, and those of a combined job are contained in a job output description file shown in FIG. 10. In addition, these files are independent from the page description file that saves intermediate code data. Hence, the setups of each job can be changed by editing the job output description file. The setup change editor 307 implements a job setup change function by editing or partially rewriting the job output description file solely or in collaboration with the spool file manager 304.

<Setup Change Process Sequence>

Figure 15:
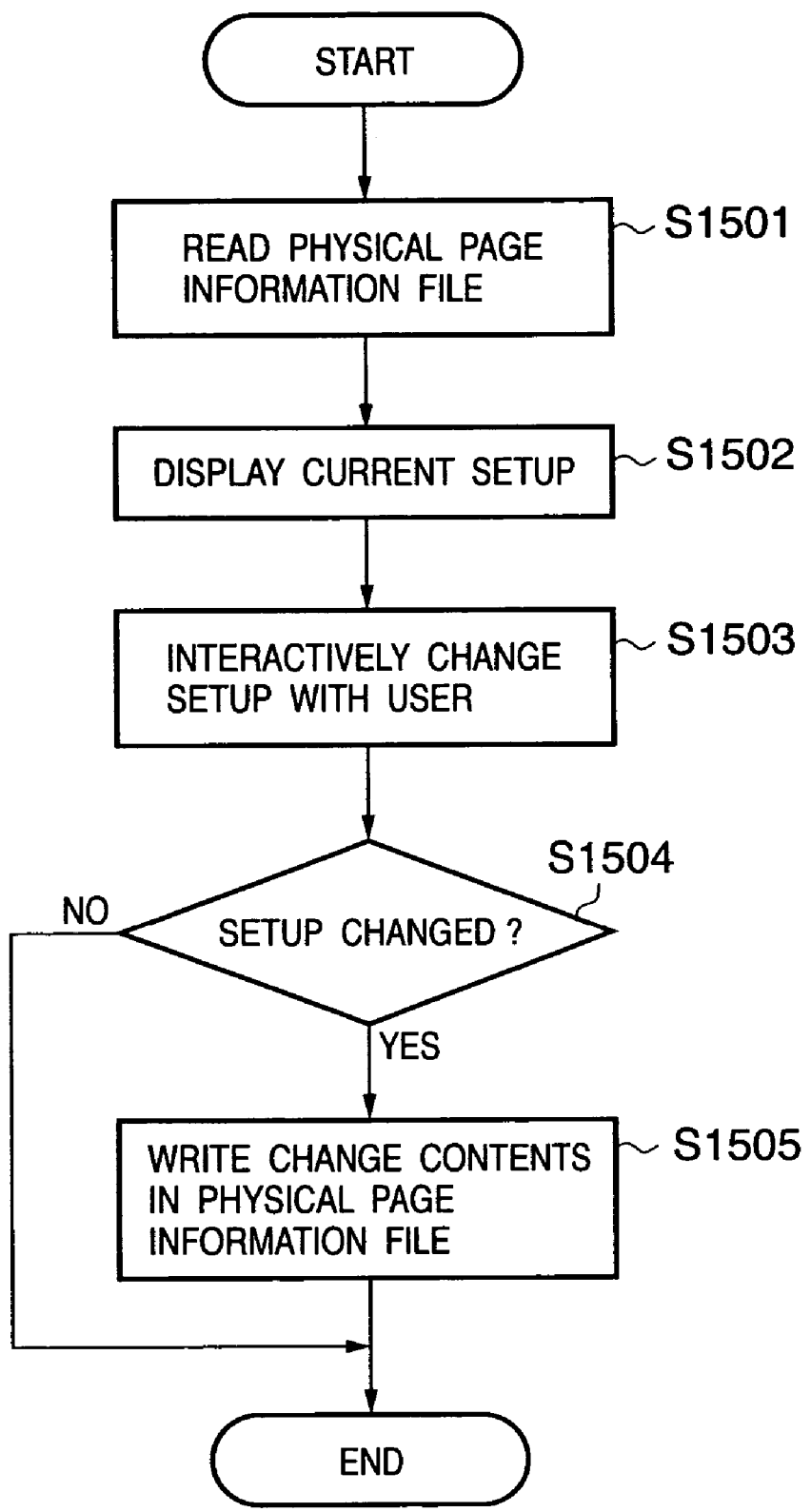
FIG. 15 is a flow chart showing the setup change process in a setup change editor 307.

FIG. 15 is a flow chart showing details of the job setup change process in the setup change editor 307.

In step 1501, the setup change editor reads a job description file or job output description file. The job output description file is the same file as that read by the previewer 306 and despooler 305. The flow advances to step 1502 to display the read result to the user. In step 1503, the setup change editor interactively changes the setup contents by the aforementioned menu designation and the like with the user on the user interface shown in FIG. 18. This step may be attained in a batch manner that changes contents in accordance with setup change contents written in a file or the like in place of the interactive manner. The flow advances to step 1504, and the setup change editor compares the contents initially read in step 1501 and the currently designated setup contents to check if the contents have been changed. If the setup contents have been changed, the flow advances to step 1505 to generate a new job output description file and inform the spool file manager of the changes, thus ending the processing.

If it is determined in step 1504 that the setup contents have not been changed, the setup change editor informs the spool file manager of that fact, thus ending the processing. A new job output description file is generated in this way. When an "OK" button is selected on the user interface window in FIG. 18, the new job output description file is enabled, and the old job output description file is deleted. When the job description file of an independent job has been changed in place of the job output description file, the old file is saved without being deleted. When a "revert to defaults" button is selected on the window shown in FIG. 18, the new job output description file is deleted, and the old job output description file is enabled and reflected in display. This embodiment has explained the setup change editor 307 as an independent module. Alternatively, the setup change editor 307 may be a part of the user interface of the spool file manager 304. Also, the setup change editor 307 may be implemented as follows. That is, the editor 307 does not actually write change contents in the job output description file and informs the spool file manager 304 of only the setup change contents, and the spool file manager 304 actually changes the job output description file.

An expansion for despooling and previewing a combined job will be explained below.

Normally, spool files 303 with the intermediate format are generated for respective jobs. In case of an independent job, since a process is executed by sequentially reading out intermediate code data of respective logical pages in the job file to be processed, the logical page ID in the field 1401 can be implemented by a relative or absolute offset which indicates the location of each logical page in a file. In case of a combined job, a spool file and page information which belongs to that job must be specified from the job ID in the field 1401. In this embodiment, a spool file is specified by appending an ID that identifies a spool file to the logical page ID. In this case, only the field 1401 can be modified. If the spool file can be identified, read of page information can be processed by the same logic as in the process of an independent job. In another implementation, when spool files are saved as independent files for respective logical pages, the file name of each logical page may be used as the logical page ID in the field 1401.

<Preview Display in Store Process>

A sequence for displaying a print preview image on the basis of a print job, which is saved as intermediate data and a job output description file, as described above, will be described below. Upon printing from an application program, the user designates a store process of a print job, as shown in FIG. 9, thus generating a print job, which is defined by intermediate code data and a job output description file in the sequence shown in FIG. 5. As a result, a list of currently stored print jobs is displayed, as shown in FIG. 16. The user can make various operations, i.e., can edit a print job, combine print jobs, add a print job or jobs to the already combined job, change the order of print jobs in the combined job, and so forth by designating a desired print job or jobs from the print job list.

In this case, when the user designates a print job or jobs from the list and designates an edit operation, combine operation, or the like using a corresponding button, menu item, or the like, the print preview window for the whole job shown in FIG. 18 is displayed. Note that this print preview window can also preview-display the relationship among pages such as association of pages and the like for the whole individual or combined print job unlike a preview window which is prepared by a normal application and displays an image for each page.

Figure 19:
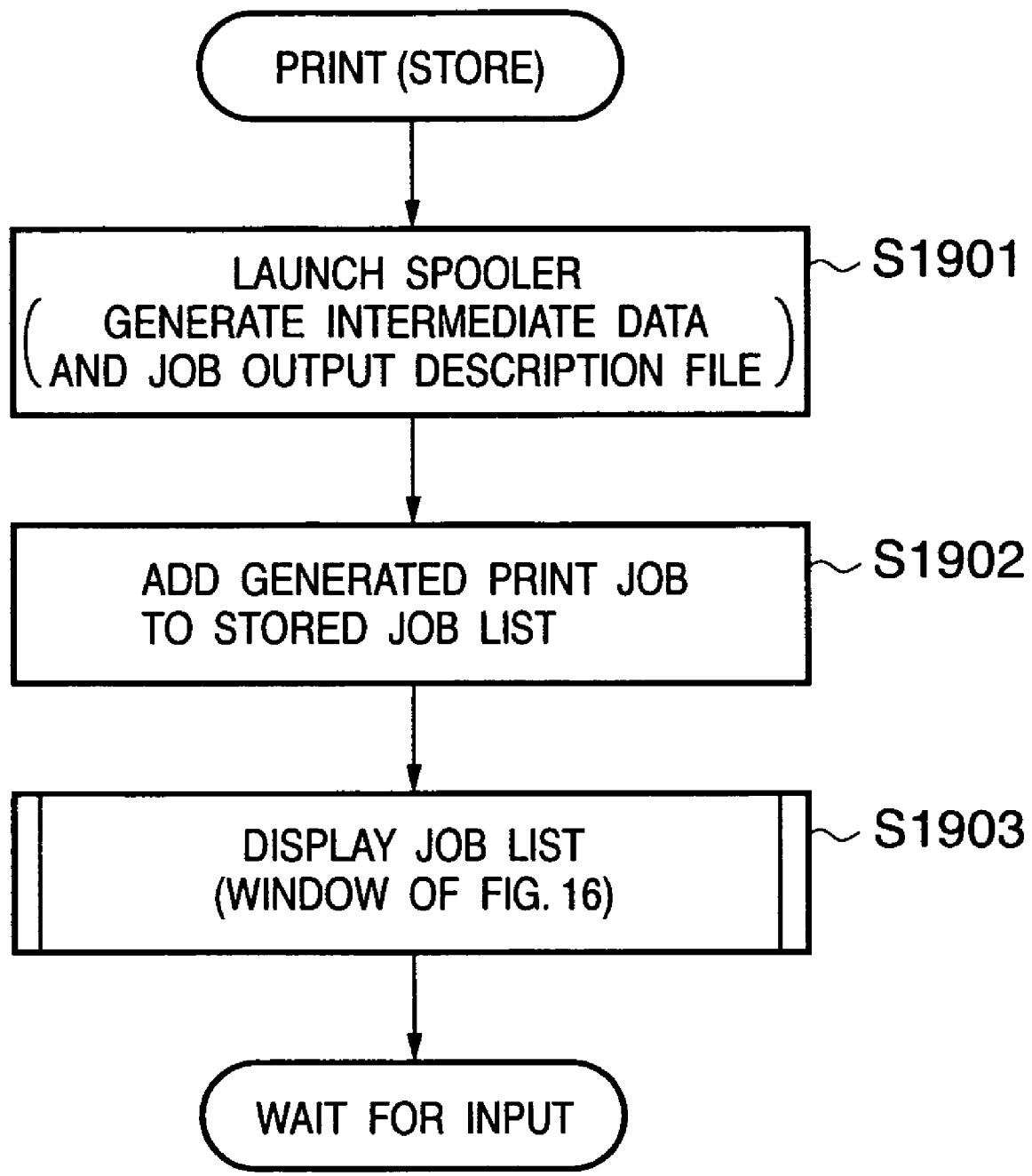
FIG. 19 is a flow chart upon printing data created by an application program or the like while designating "store"

FIG. 19 shows the sequence upon printing data created by an application program or the like while designating "store" When the user selects "store" from the menu 901 as the output destination on the window in FIG. 9 and issues a print instruction, the sequence shown in FIG. 9 is executed. In step S1901, the spooler is launched to generate and store intermediate data and a job output description file. Upon designation of "store", the spooler does not instruct the spool file manager to start a print process, and the intermediate data is held without being printed. In this embodiment, the print job in such state will be referred to as a stored print job hereinafter.

The print job which is converted into the intermediate data and is held in step S1901 is added to the already stored print job list in step S1902. In this embodiment, the stored print jobs are held only while programs (the previewer 306 and setup change editor 307 in FIG. 3) used to manage such stored print jobs are running, and are erased when these programs quit. However, the stored print jobs may be held until they are positively deleted.

If a new print job is added to the stored print job list, a list of these jobs is displayed in step S1903, as shown in FIG. 16. Note that print jobs held as intermediate data will be referred to as held jobs hereinafter, and a job or jobs to be edited or combined selected from these jobs will be referred to as a job or jobs of interest (or target job or jobs) hereinafter.

<Display of Job List>

Figure 20:
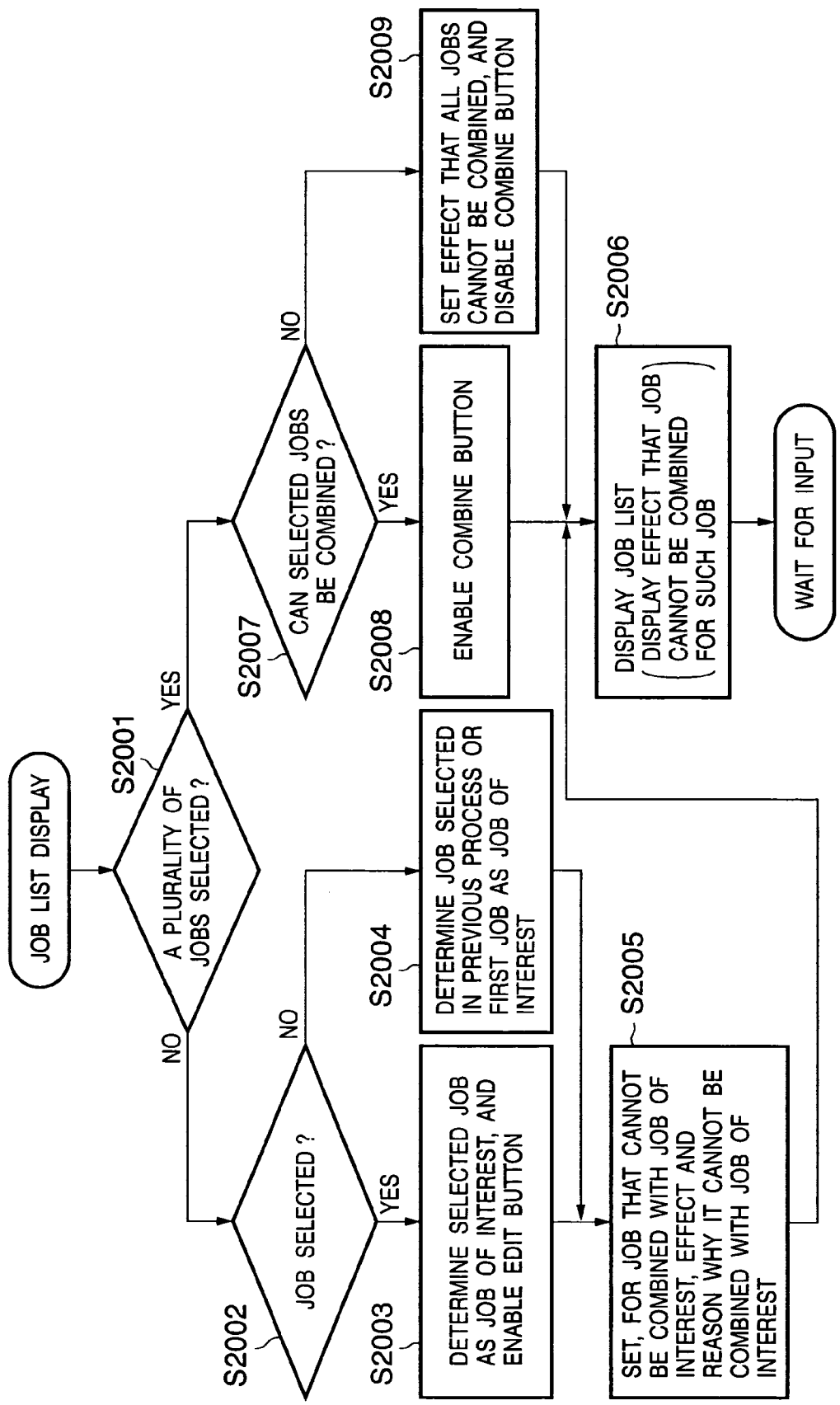
FIG. 20 is a flow chart showing details of step S1903 in FIG. 19.

FIG. 20 is a flow chart showing details of step S1903 in FIG. 19. Note that the sequence shown in FIG. 20 is executed to update the displayed job list every time a state to be displayed is changed (e.g., when a job or jobs is or are selected from the job list).

It is checked in step S2001 if a plurality of jobs are selected. If NO in step S2001, it is checked in step S2002 if a job is selected. If YES in step S2002, that job is determined as a job of interest, and an edit button is enabled. The edit button is a button 1608 in FIG. 16. FIG. 16 shows a state immediately after a single job is selected, and the edit button is enabled.

On the other hand, if no job is selected, a job which was selected in the previous process is determined as a job of interest in step S2004. If no such job is available, i.e., if the job list is displayed for the first time, a job at the top of the job list is determined as a job of interest.

After the job of interest is determined, a job or jobs which cannot be combined with the job of interest is or are picked up from all the jobs, and the effect and reason why the job or jobs cannot be combined with the job of interest are set in a predetermined memory area or the like in step S2005. Note that a job that cannot be combined with the job of interest is a job which has one of the designated resolution, the number of bits per pixel, and a graphic mode different from that of the job of interest.

Figure 26:
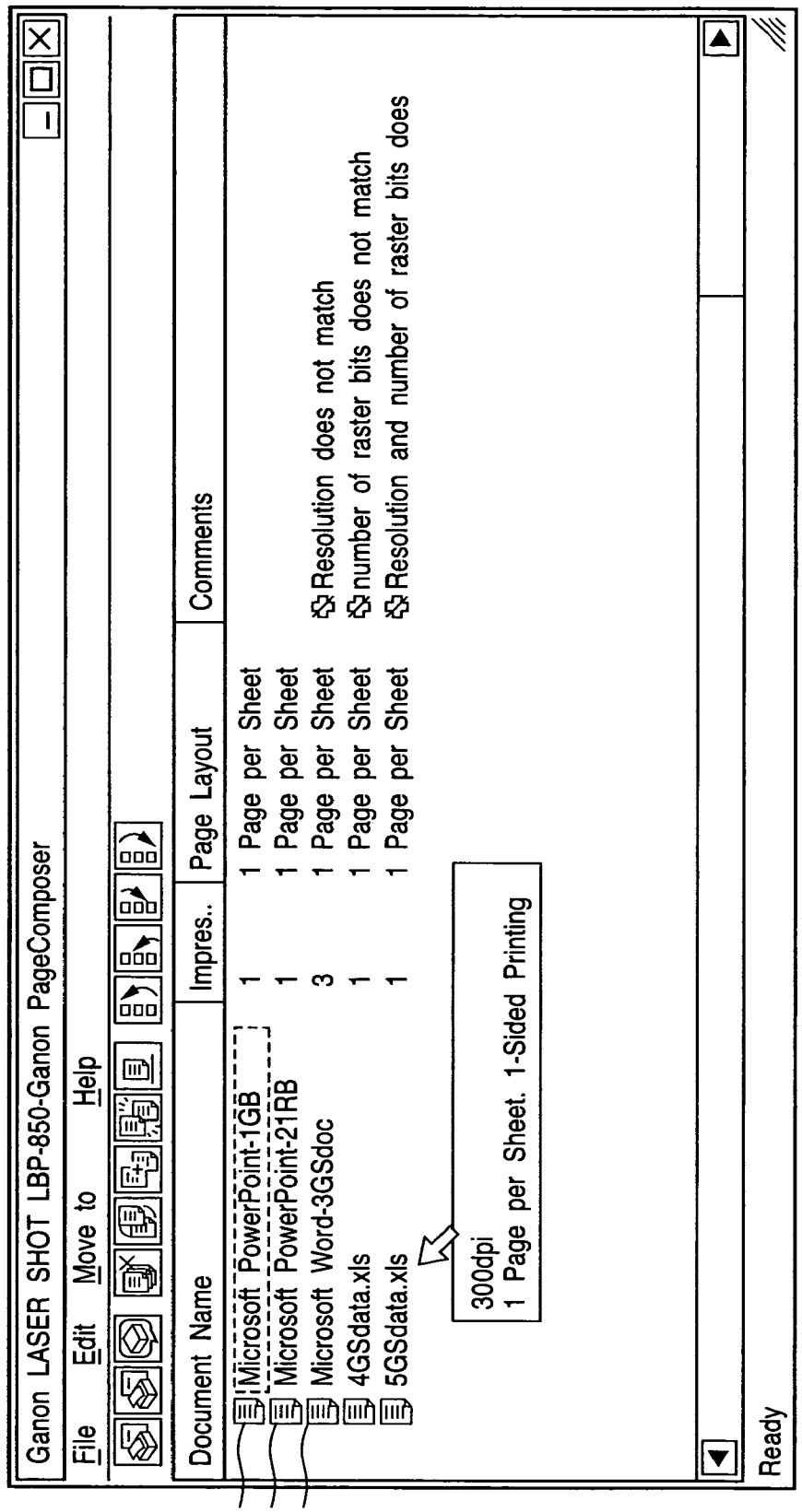
FIG. 26 shows a display example of a job list.

Finally, the job list is displayed in step S2006. In this case, as for each job for which the effect and reason why it cannot be combined with the job of interest are set in step S2005, a symbol indicating that this job cannot be combined with the job of interest and a reason for it are displayed in the column where that job is displayed. FIG. 26 shows this state. Since a job 2602 can be combined with a selected job 2601, but a job 2603 and subsequent jobs cannot be combined, symbols indicating that effect are displayed on the left side of comments, and reasons why these jobs cannot be combined are displayed in comment fields.

On the other hand, if a plurality of jobs are selected, it is checked in step S2007 if the selected jobs can be combined. If YES in step S2007, a combine button (a button 1606 in FIG. 16) is enabled (selectable) in step S2008, and the flow advances to step S2006 to display the job list.

If all the selected jobs cannot be combined, an effect indicating that all the held jobs cannot be combined is set in step S2009. In step S2006, symbols and comments are displayed for the jobs for which the effect indicating that they cannot be combined is set in step S2009.

In this way, the job list is displayed. As described above, since the sequence in FIG. 20 is executed every time a job is selected from the job list, jobs that can be combined with the selected job, and the possibility/impossibility of the edit or combine operation for the selected job can be presented to the user.

<Edit/Combine Operation>

Figure 21:
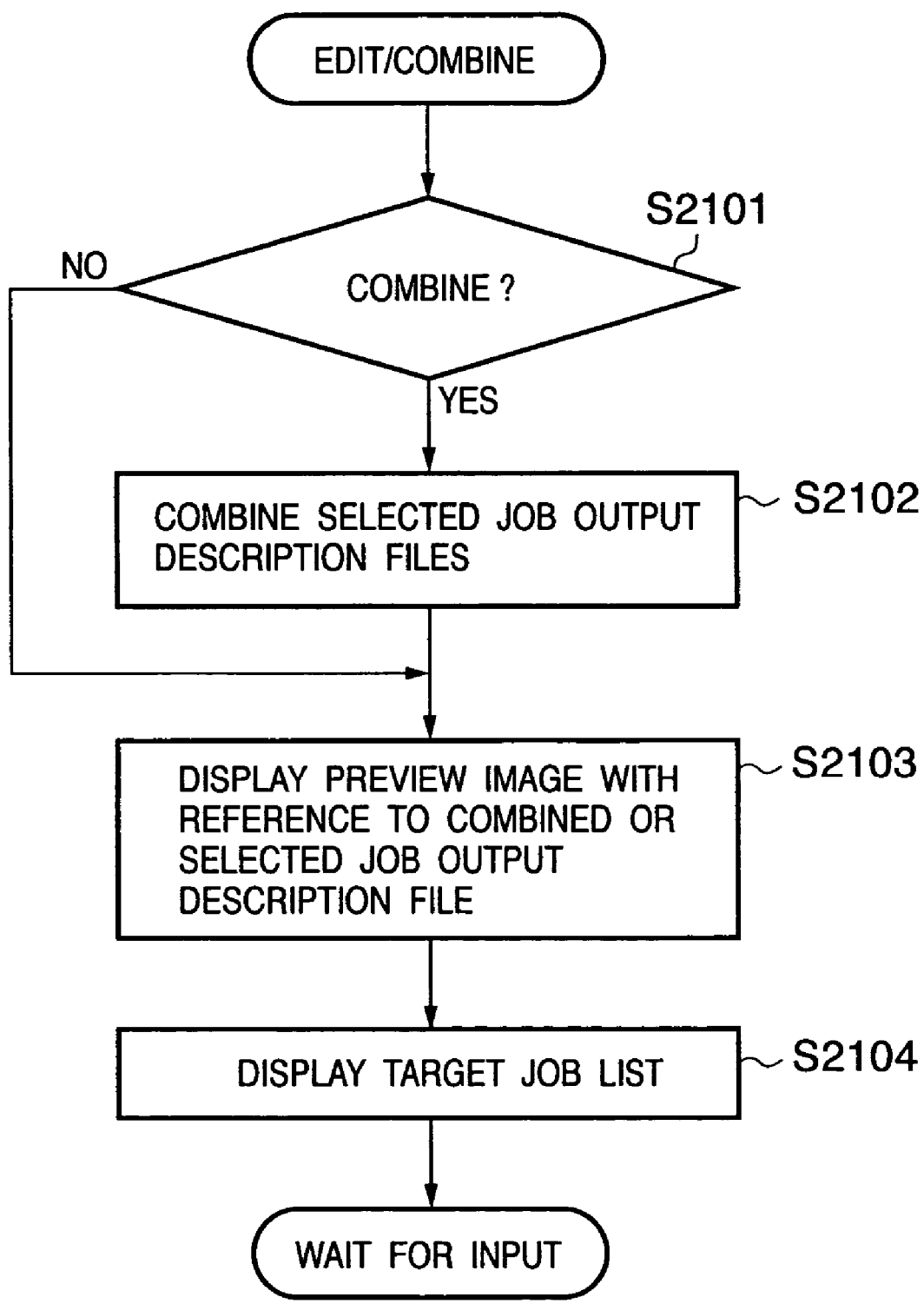
FIG. 21 is a flow chart showing the processing sequence upon operation of an edit button or combine button while a job is selected from a job list.

When the edit button (when only one job is selected) or the combine button (when a plurality of jobs are selected) is pressed while a job or jobs are selected from the displayed job list, the sequence shown in FIG. 21 is executed. When jobs which cannot be combined are selected, no combine operation is available.

It is checked in step S2101 if the combine operation is made. If YES in step S2101, selected job output description files are tentatively combined in step S2102. Since this operation is not settled, a tentative job output file is generated and used. Upon combining jobs, some setup values are changed to common values in place of the individual setups of the jobs.

As the method of setting common setups, the setup values may be changed to predetermined ones, or the setups of jobs other than the first job are set or cleared in correspondence with those of the first job. For example, the designated print methods of jobs to be combined are commonly set to be a 1-sided print mode unless they are all designated with a 2-sided print mode. Also, the setup values of the binding margin, staple designation, ascending/descending print order, face-up/down print, use of an inserter, and the like are set in correspondence with those of the first job. In addition, the setup values of the number of copies, booklet designation, and the like are cleared.

Preview display is executed using the job output description file combined in step S2102 or that of a job selected as a job to be edited in step S2103, and a target job list is displayed in step S2104. The preview window displays thumbnail images of all pages contained in jobs to be edited or combined in accordance with their layouts. On the other hand, the target job list displays the names, number of pages, and page layouts of jobs to be edited or combined. In this list display, in case of the combine operation, the job order can be sorted desirably, and a desired job can be deleted from the target jobs. When the target job is operated in this manner, the sequence shown in FIG. 21 is executed again, and the preview window and target job list are re-displayed.

Also, the print setups of the target job can be changed. Items that can be changed are those which can be changed by editing the job output description file. Items that require operations of intermediate data are inhibited from being operated in this embodiment. However, all items may be re-set regardless of the processing time or resources required. Items that can be re-set in the system of this embodiment are the print method (1-sided/2-sided/booklet), the number of copies, the availability of stapling, and the like.

<Print Preview Display of Target Job>

Figure 22:
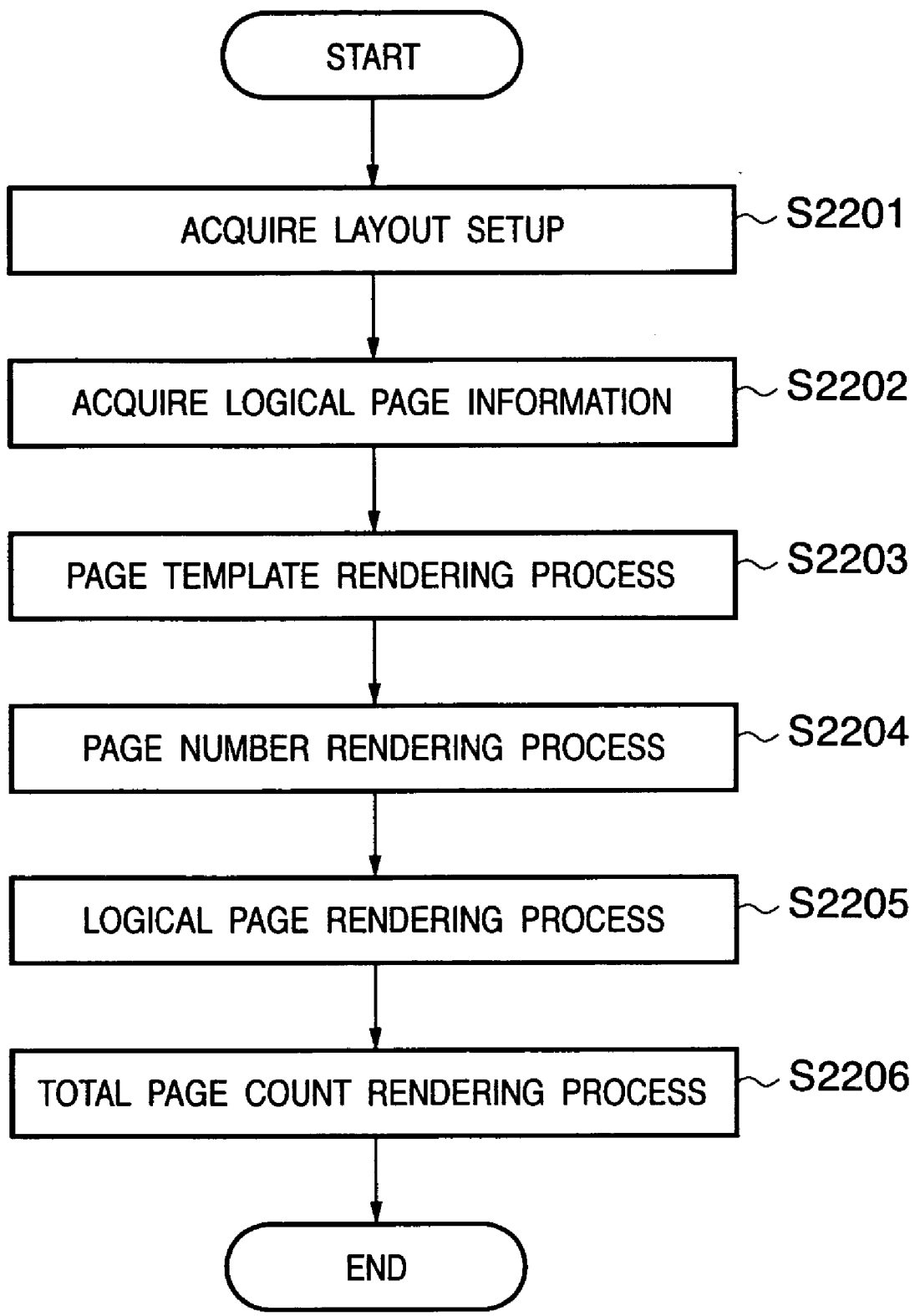
FIG. 22 is a flow chart showing the sequence for displaying a preview window upon operation of an edit button or combine button while a job is selected from a job list.

FIG. 22 is a flow chart showing a rough sequence for displaying the job preview window shown in FIG. 18 when the user instructs to make desired operation such as job edit, combine, or the like on the list display window of print jobs shown in FIG. 16, and shows details of step S2103 in FIG. 21.

Referring to FIG. 22, the layout setups of target jobs are acquired in step S2201. The layout setup items include the print method, page layout, page frame, finishing, paper source switching, and the like, and these pieces of information are acquired from the job output description file shown in FIGS. 10 to 13.

The layout setup items will be briefly explained below. Examples of items to be set are as follows.

(1) Print method: One of 1-sided, 2-sided, and booklet print methods is designated. The 1- and 2-sided print methods are well known. The booklet print method prints data to obtain the appearance of a booklet by only folding printed sheets in half and binding them. When the booklet print mode is designated, one of a method of folding a set of copies in half, and a method of designating a predetermined number of sheets, folding each predetermined number of sheets in half, and then stacking and binding them can be designated as half fold units. Such half fold unit is called a booklet unit.

In the booklet print mode, since a booklet is formed by stacking and folding, e.g., two output sheets in half, data cannot be printed in the order of logical pages created by the application. The output order of logical pages, i.e., the layout order of logical pages on physical pages, is determined in advance so that pages appear in the logical page order by turning pages of the formed booklet from the right or left (this direction is designated separately). Also, the order of logical pages differs depending on whether sheets are exhausted facing up or down.

Since the booklet print mode corresponds to a 2-sided 2-up print mode in consideration of only the format regardless of the order of pages, four logical pages are printed on the obverse and reverse faces of a single sheet. Hence, the required number S of sheets is given by S=the number of logical pages/4 (by generating a carry for any digits after the decimal point). For example, when the exhaust method is face-up, and the booklet unit is S sheets, the $(4\times(P-1)+2\times Q-1)$-th logical page and $(4\times(P-1)+4\times S-2\times(Q-1))$-th logical page are laid out on the obverse face (the face printed first) of the Q-th sheet of the P-th booklet unit, and the $(4\times(P-1)+2\times Q)$-th logical page and $(4\times(P-1)+4\times S-2\times Q-1)$-th logical pages are laid out on its reverse face. In case of the face-down exhaust method, the reverse face can replace the obverse face.

(2) Booklet Binding Direction: This item indicates a direction to turn pages, and one of top binding, right binding, and left binding can be designated.

(3) Booklet Unit: As described above, this item indicates a half fold unit.

(4) Page Layout: One of a layout, so-called Nup print, that lays out N logical pages on one face of a sheet, and a layout, so-called poster print, that prints one logical page while dividing it onto a plurality of sheets can be designated.

(5) Finishing: This item can designate a post print process. For example, an external apparatus called an inserter can insert a sheet supplied independently of printed sheets as a cover page.

(6) Paper Source Switching: This item designates the way sheets are fed. For example, when middle insert is designated, sheets fed from one of feed ports undergo a print process, and sheets fed from the other feed port are inserted and exhausted between neighboring printed sheets. That is, sheets are alternately fed from the two feed ports.

These items that can be designated as layout setups have been explained.

In step S2202, logical page information is acquired. The logical page is a page in data created by the application program or the like. When the Nup print mode is designated, a plurality of logical pages are printed on one physical page, i.e., on one face of one sheet. This logical page information is as shown in FIG. 14.

In step S2203, a page template is rendered on the basis of the information acquired in steps S2201 and S2202. The page template is a framework of each physical page in accordance with the designated layout, and is rendered in correspondence with the designated paper size and layout setups such as designation of 1-sided/2-sided/booklet, portrait/landscape, and the like. However, when the poster print mode is designated, since the combined state of images is displayed as a preview image, the above process is not applied.

In step S2204, a page number given to each page to be displayed as a preview image is rendered. In this case, pages are given in the order of logical or physical pages in accordance with the layout. In this way, the user can confirm accurate page numbers corresponding to the layout on the print preview window.

In step S2205, logical pages are rendered in correspondence with each page template. In this case, the job output description file shown in FIGS. 10 to 14 is looked up, and logical pages are rendered on a single physical page in accordance with the setups registered in the job output description file. Intermediate data of the logical pages to be rendered are acquired with reference to the logical page information shown in FIG. 14.

Finally, in step S2206 the total number of pages or the required number of sheets is rendered. The total number of pages amounts to the number of logical pages, and the required number of sheets is the number of paper sheets to be output.

(Page Template Rendering)

Figure 23:
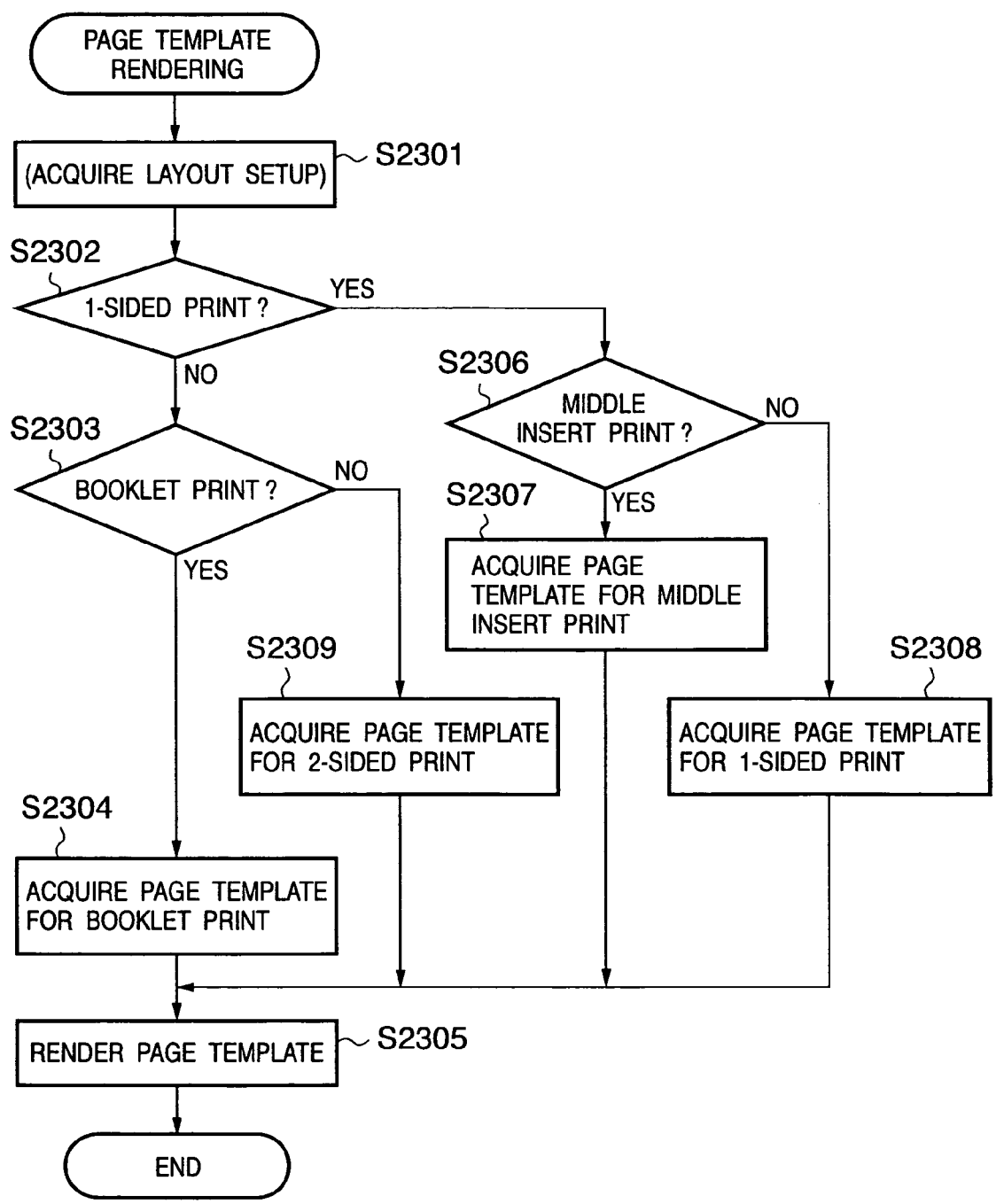
FIG. 23 is a flow chart showing details of step S2203 in FIG. 22.

FIG. 23 is a flow chart showing details of step S2203 in FIG. 22. The layout setups are acquired in step S2301 (enclosed in parentheses since the layout has already been acquired in step S2201 in FIG. 22), and the print method is checked in steps S2302 and S2303. If the booklet print mode is selected, a page template for booklet print is acquired in step S2304; if the 2-sided print mode is selected, a page template for 2-sided print is acquired in step S2309. Details of step S2304 will be explained later using FIG. 27.

If the 1-sided print mode is selected, it is checked in step S2306 if the middle insert print mode is selected. The middle insert print mode is a print method that inserts and exhausts independently fed paper sheets between neighboring output printed sheets, and is used when transparent documents for an overhead projector are printed. If the middle insert print mode is selected, a page template for middle insert print is acquired in step S2307; otherwise, a page template for 1-sided print is acquired in step S2308.

Lastly, in step S2305 the page template is rendered in accordance with the acquired page template data.

(Page Number Rendering)

Figure 24:
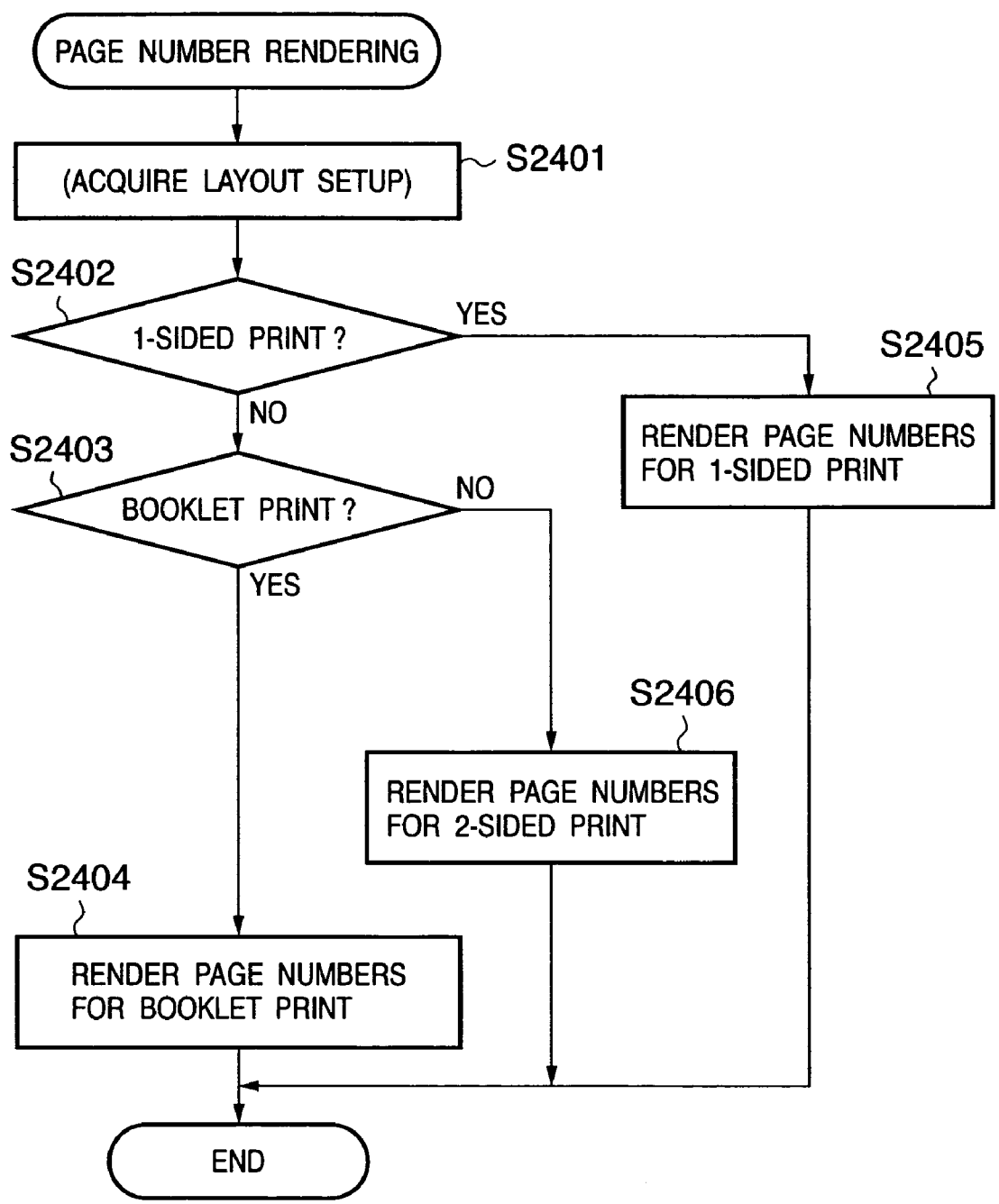
FIG. 24 is a flow chart showing details of step S2204 in FIG. 22.

FIG. 24 is a flow chart showing details of step S2204 in FIG. 22. The layout setups are acquired in step S2401 (enclosed in parentheses since the layout has already been acquired in step S2201 in FIG. 22), and the print method is checked in steps S2402 and S2403. If the booklet print mode is selected, page numbers for booklet print are rendered in step S2404; if the 2-sided print mode is selected, page numbers for 2-sided print are printed in step S2406. On the other hand, if the 1-sided print mode is selected, page numbers for 1-sided print are rendered in step S2405. Details of step S2404 will be described later using FIG. 28.

(Logical Page Rendering)

Figure 25:
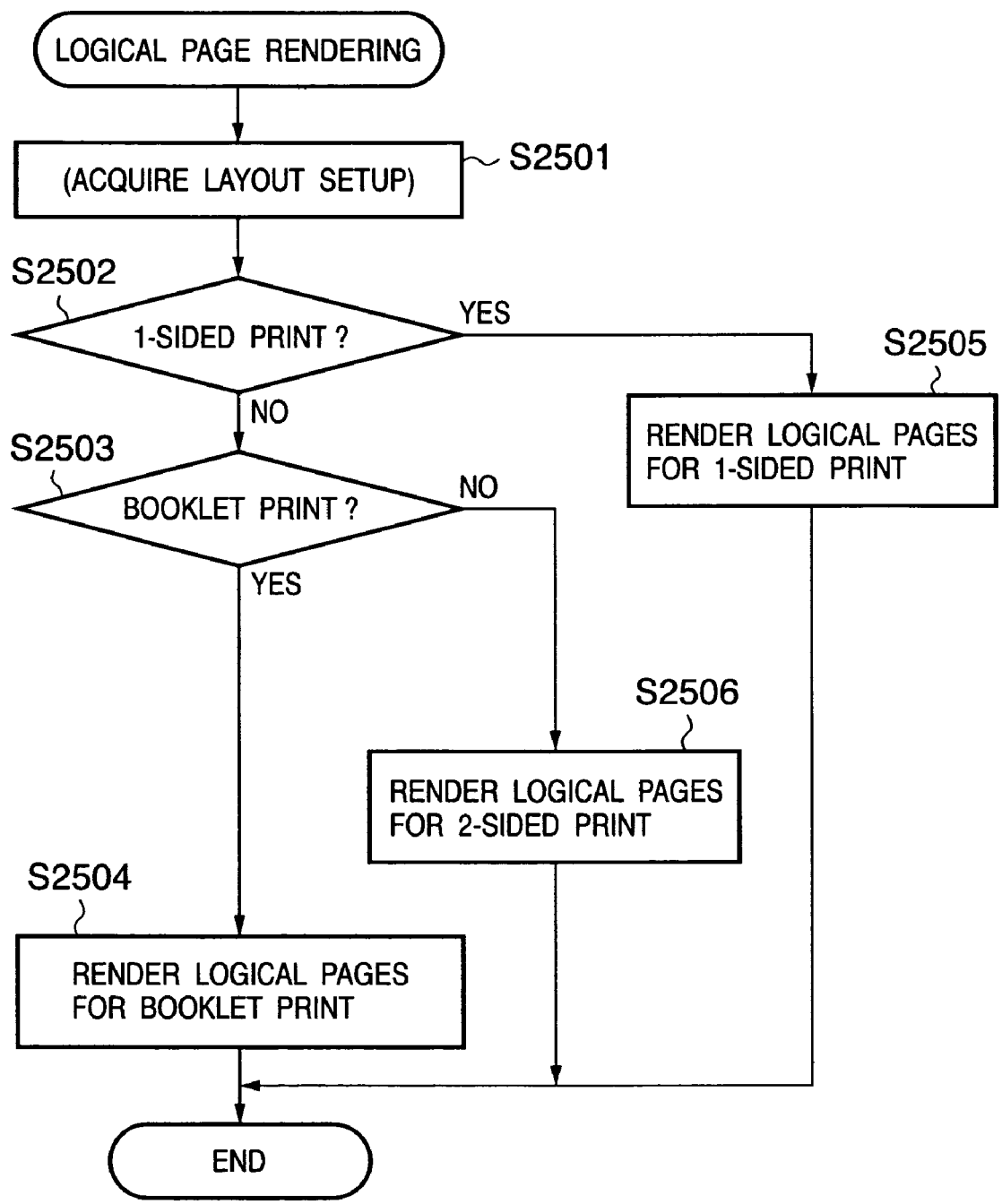
FIG. 25 is a flow chart showing details of step S2205 in FIG. 22.

FIG. 25 is a flow chart showing details of step S2205 in FIG. 22. The layout setups are acquired in step S2501 (enclosed in parentheses since the layout has already been acquired in step S2201 in FIG. 22), and the print method is checked in steps S2502 and S2503. If the booklet print mode is selected, logical pages for booklet print are rendered in step S2504; if the 2-sided print mode is selected, logical pages for 2-sided print are rendered in step S2506. On the other hand, if the 1-sided print mode is selected, logical pages for 1-sided print are rendered in step S2505. Since logical pages are rendered in accordance with the job output description file and logical page information, a process that does not classify according to the print method may be done. Details of step S2504 will be described later using FIG. 29.

<Details of Preview Display in Booklet Print Mode>

As described above, the print preview window according to the designated layout is displayed. A preview display method upon designation of booklet print as a print method will be described in detail below.

In this embodiment, the following four preview methods are available in the booklet print mode. The user can set a preview display method using a pull-down menu 3501 shown in FIG. 35. The printer driver selects one of variations 1 to 4 below in accordance with the setup at this pull-down menu 3501 and makes a preview display.

1) Physical Page Reference—Variation 1

In the method of assigning logical pages on each sheet in the booklet print mode, as described above (with reference to FIG. 22), logical pages are laid out as they are designated depending on designation of face-up/down and designation of a booklet unit after a booklet is formed, and these logical pages are rendered on each physical page. In physical page reference, this print result is directly displayed as a preview image.

Normally, it is significant for a normal layout such as that for the 1- or 2-sided print mode to display a preview image of a physical page. However, in the booklet print mode, since logical pages to be laid out on each physical page do not appear in due order, the user can hardly imagine the output result if he or she previews the physical page.

Figure 35:
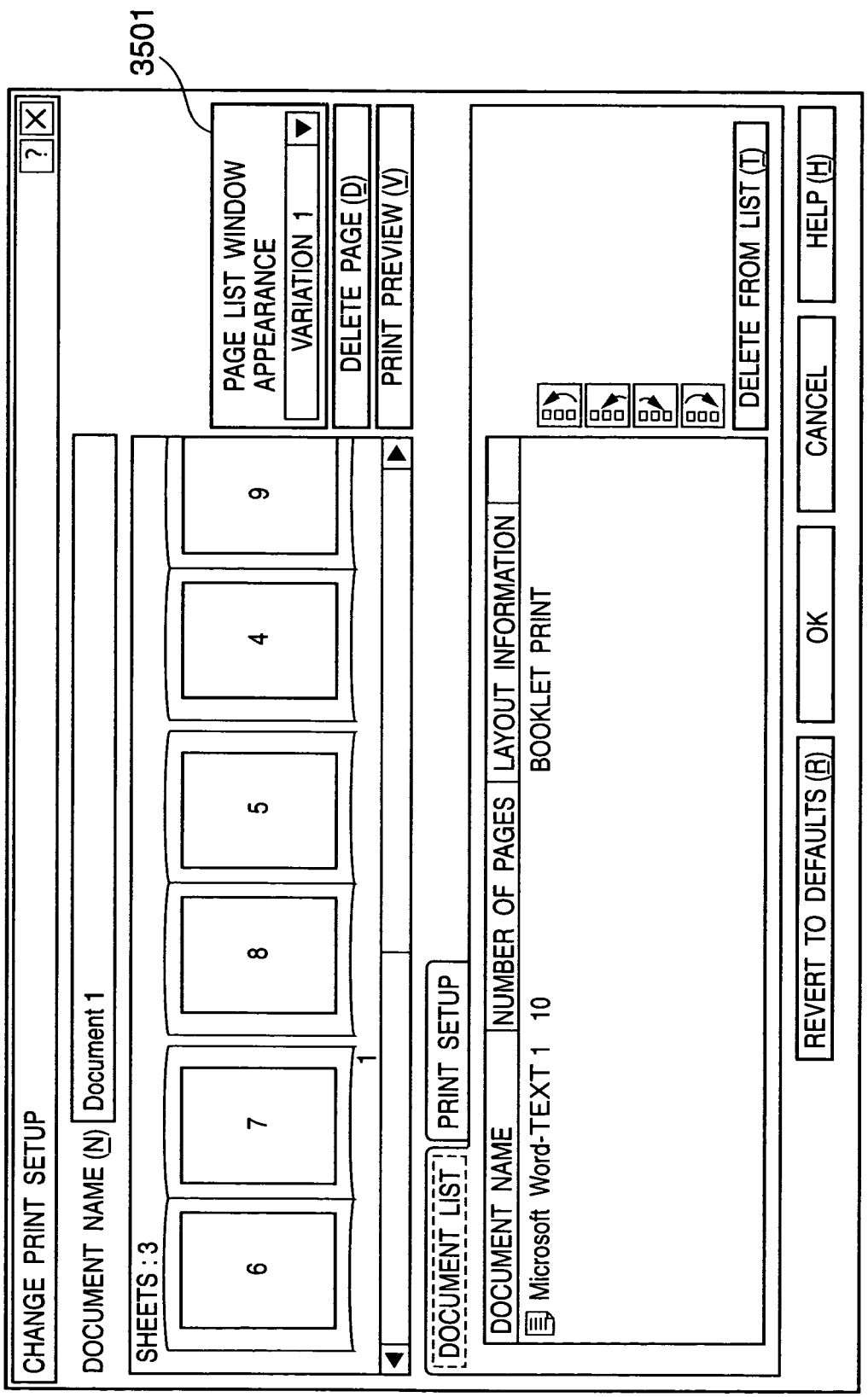
FIG. 35 shows an example in which a preview window for physical page reference (variation 1) and left binding is displayed on a preview display select window.

However, when the result of each individual paper sheet that has actually undergone the booklet print process is to be compared with a preview display in the aforementioned "save & print" function that prints while holding a stored job to be actually printed on paper sheets, it is difficult for a logical page reference display method to make such comparison. Hence, the physical page reference preview display is effectively used in such case. FIG. 35 shows an example of the physical page reference preview display. In FIG. 35, page numbers bounded by boxes are appended to preview pages so as to clarify the page order. However, in practice, rendering data sent from an actual document are previewed on these pages.

2) Logical Page Reference—Variation 2

As described above, since logical pages to be laid out on each physical page do not appear in due order, a preview in a double-page spread state is required in place of a preview display with reference to a physical page, upon displaying a state when the user actually picks up a document in the form of a booklet. In this embodiment this display method will be referred to as logical page reference hereinafter.

Figure 34A:
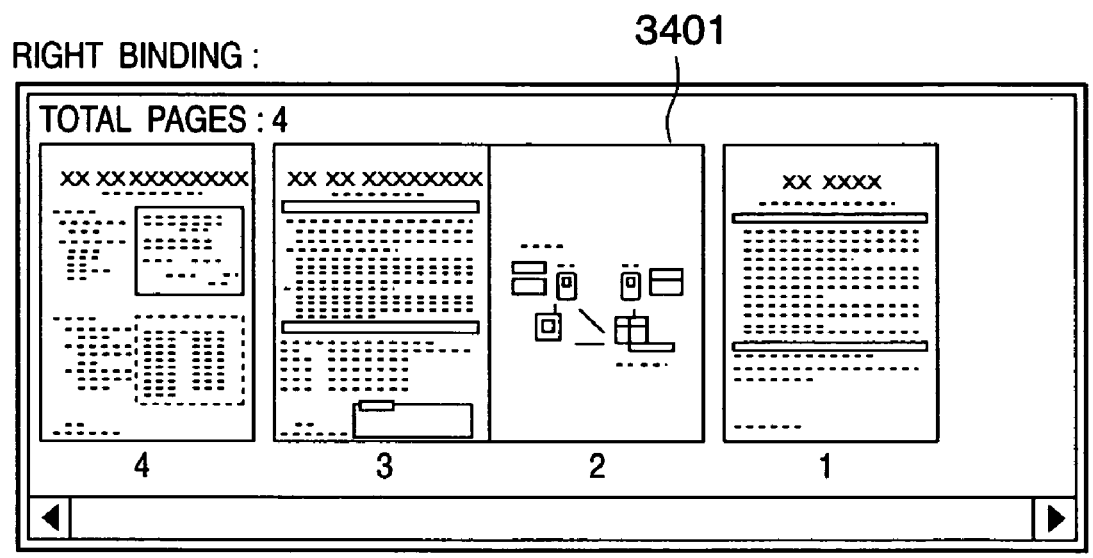
FIGS. 34A and 34B show examples of preview windows in case of right binding (FIG. 34A) and top binding (FIG. 34B)
Figure 34B:
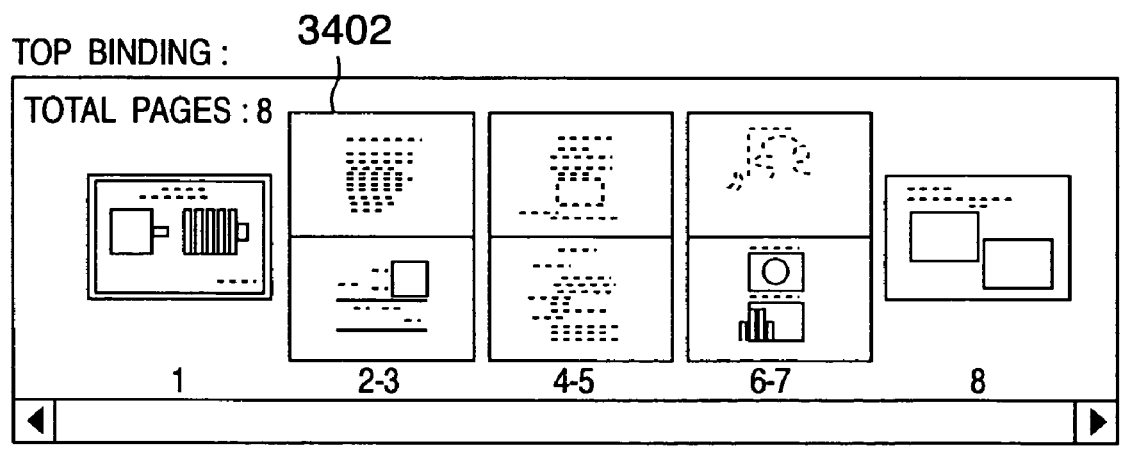
Figure 36:
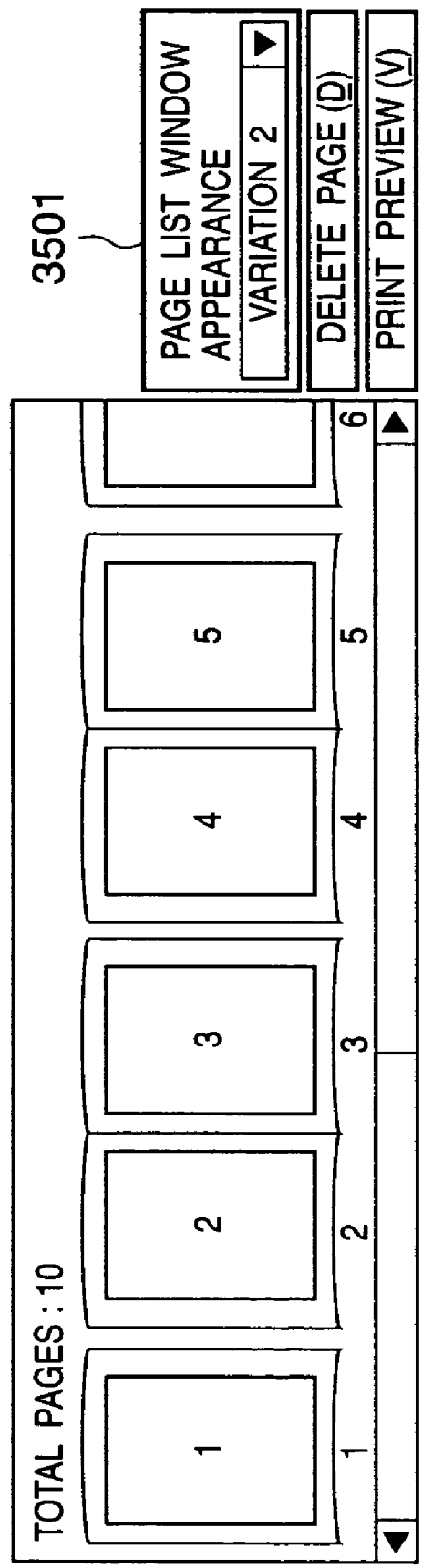
FIG. 36 shows a display example of a preview window for logical page reference (variation 2)

FIG. 36 apparently shows an example of the logical page reference preview state when left binding is designated. In this case, logical pages appear in the order of turning pages from the left to right. Upon making a preview display by arranging logical pages from the right to left in case of right binding, from the left to right in case of left binding, and from top to bottom in case of top binding, the user can easily understand a complete form of booklet print. FIG. 34A shows an example of right binding. In this case, logical pages are laid out so that their page numbers increase to the left to have the rightmost end as a cover page. FIG. 34B shows an example of top binding. Since sheets to be printed are arranged side by side on the preview window, a top-to-bottom layout is not adopted as a whole, but logical pages are laid out in turn from top to bottom for each sheet. That is, logical pages are laid out in a zigzag pattern from the upper left to the lower right.

With the aforementioned logical page reference preview display mode, the user can easily confirm the page layout of a booklet. When the logical page reference is designated in the booklet print mode, the display method of the number of pages must be taken into account so as to display double-page spreads. The total number of pages (total number of sheets) is displayed in a normal layout, but the total number of logical pages is displayed in the booklet print mode.

(Designation of Booklet Unit)

In the logical page reference preview display mode, logical pages are displayed in the order of page spreads, as described above. However, different templates must often be used depending on designated booklet units upon rendering logical pages.

Figure 31:
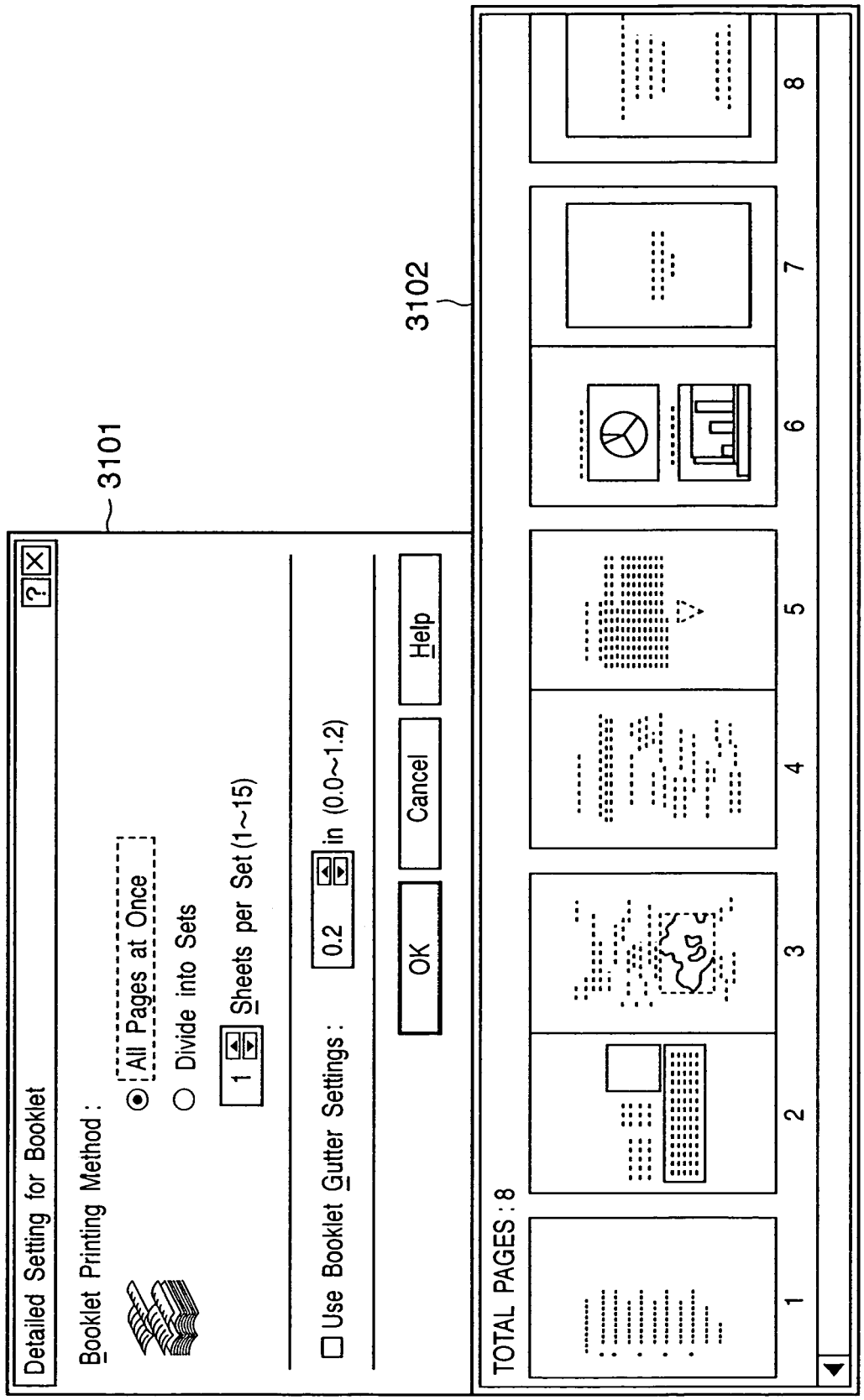
FIG. 31 shows an example of a preview image upon designation of "all pages at once"

FIG. 31 shows an example of a preview image upon designation of "all pages at once" that forms a booklet by folding all printed sheets into half together for a document of a total of eight logical pages. When "all pages at once" is designated on a setting window 3101, all pages other than the front cover (first page) and back cover (eighth page) are displayed as page spreads, as shown in a preview window 3102.

Figure 32:
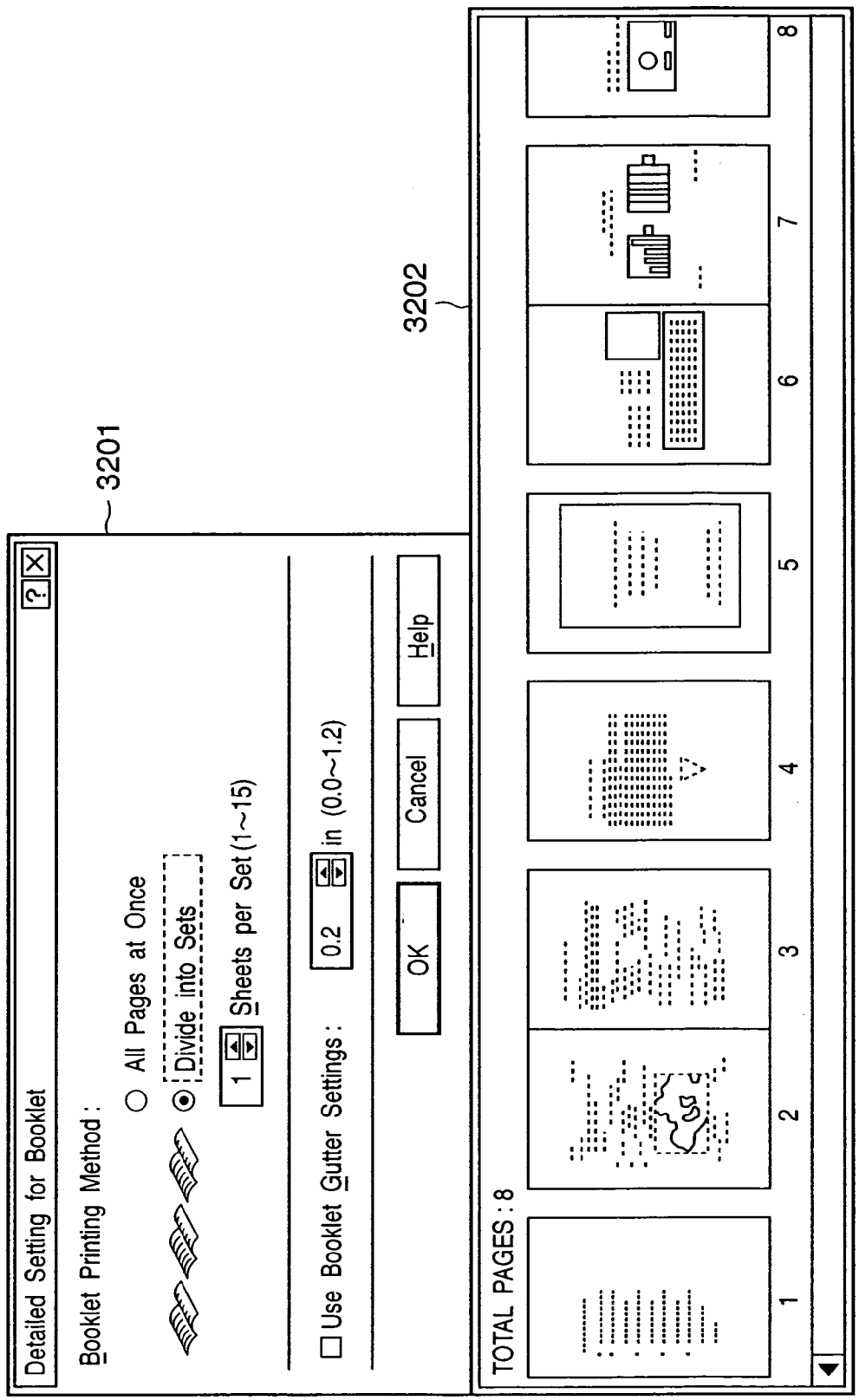
FIG. 32 shows an example of a preview image upon designation of "divide into sets (N-sheet print)"
Figure 33:
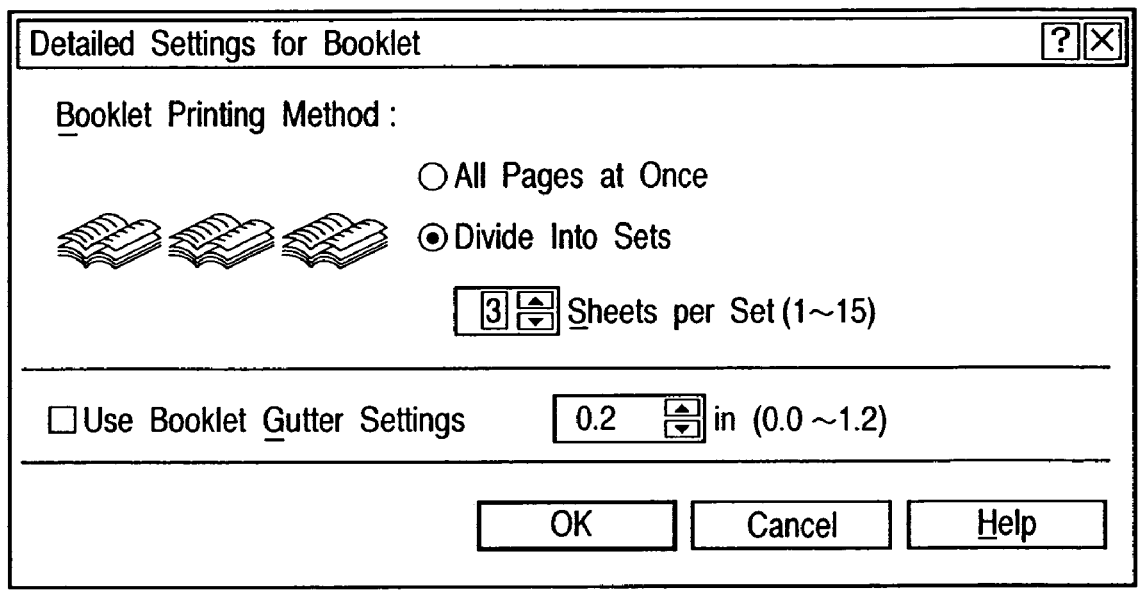
FIG. 33 shows an example of a window upon designation of three sheets as a booklet unit.

FIG. 32 shows an example of a preview image upon designation of "divide into sets (N-sheet print; N=1)" to have one sheet as a booklet unit for a document of a total of eight logical pages. When the N-sheet print function is designated on a setting window 3201, front and back cover pages are identifiably displayed for N sheets per set. In the example of FIG. 32, the first to fourth pages form one sheet as a booklet unit, and the fifth to eighth pages form one sheet as the next booklet unit. In this way, when the booklet unit is designated, the preview window is displayed while being divided into booklet units. Note that FIG. 33 shows an example of a window upon designating three sheets as a booklet unit.

As a consequence, a print result, i.e., divided booklet pages, that do not allow the user to easily imagine the output result can be confirmed on the window.

3) Logical Page Reference (Cover Booklet Print: Cover Pages and Body Text Pages are Separately Displayed)—Variation 3

In the booklet print mode, a cover booklet print function is often provided. With this function, a sheet which is located on the outermost side upon folding is handled as a cover sheet, and arbitrary pages are designated while defining four logical pages laid out on that cover sheet as "front cover page", "inside front cover page", "inside back cover page", and "back cover page" in the order of page spreads. FIG. 30 shows an example of a user interface used to designate the cover booklet print function. A check box 3001 is used to designate whether or not cover booklet print function is used.

Check boxes 3002 are used to change a page designation method for the front cover page, inside front cover page, inside back cover page, and back cover page. In this example, when these check boxes are checked, spin boxes that belong to a numerical value input area 3003 are enabled, since it is determined that logical pages to be printed are directly input using numerical values. On the other hand, if these check boxes are not checked, drop-down controls that belong to a control group 3104 are enabled, since it is determined that logical pages are designated like "last page", "last page-1", and the like without directly inputting numerical values.

When the application does not have a value designated using a given spin box 3003, e.g., a value equal to or larger than 11 or zero is input for a document of 10 pages, the corresponding cover sheet portion is handled as a blank page.

Using the drop-down control group 3004, "blank", "last page", "last page-1", "last page-2", and "last page-3" can be designated. Even when no numerical value input is made, the user can efficiently designate pages using the above selection items in most cases.

In case of such cover booklet print, the user may want to independently confirm the result of cover pages, and that of body text pages. In such case, a method of independently displaying cover pages and body text pages is effective.

Figure 37:
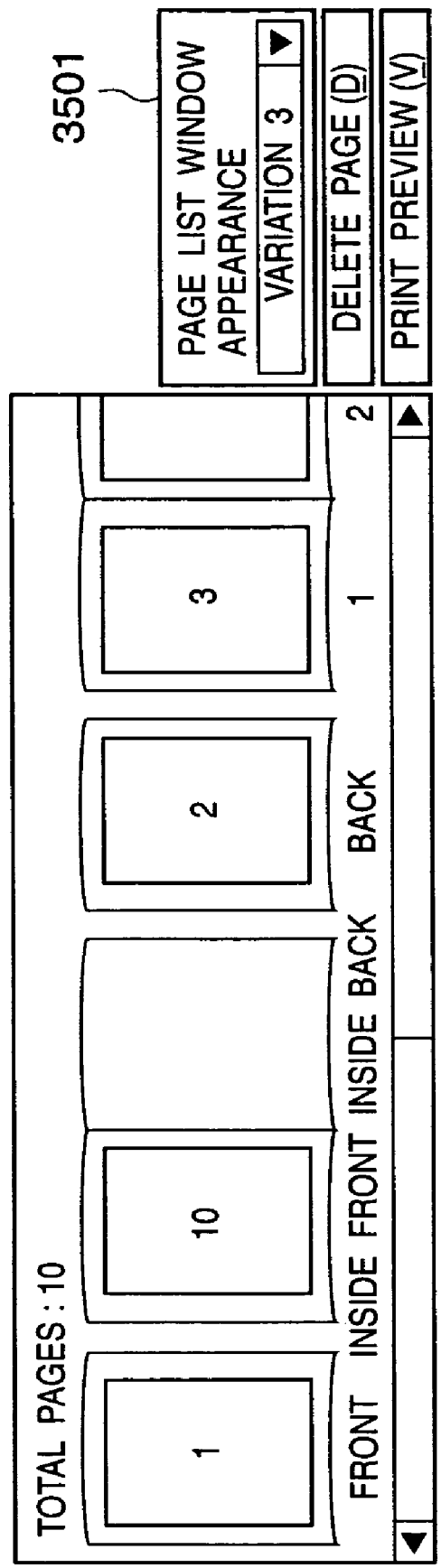
FIG. 37 shows a display example of a preview window that independently handles cover pages and booklet pages in a cover booklet printing mode.

In order to help more intuitive understanding of the cover page booklet print function, a case will be exemplified below wherein a 10-page document undergoes the cover booklet print process. In a setup shown in FIG. 30, the first page is laid out as a front cover page; the last page, i.e., the 10th page as an inside front cover page; a blank page as an inside back cover page; and the second page as the back cover page. FIG. 37 shows the preview state in this setup. In this case, the front cover page, a page spread of the inside front and back cover pages, and the back cover page are displayed in turn.

These pages are preview images of the cover pages, and those of body text pages follow while being divided in the same manner as in a case wherein the preview booklet unit is designated.

4) Logical Page Reference (Cover Booklet Print: Cover Pages and Body Text Pages are Displayed Together)

In this preview method, cover pages and body text pages are displayed together even in the cover booklet print function.

Figure 38:
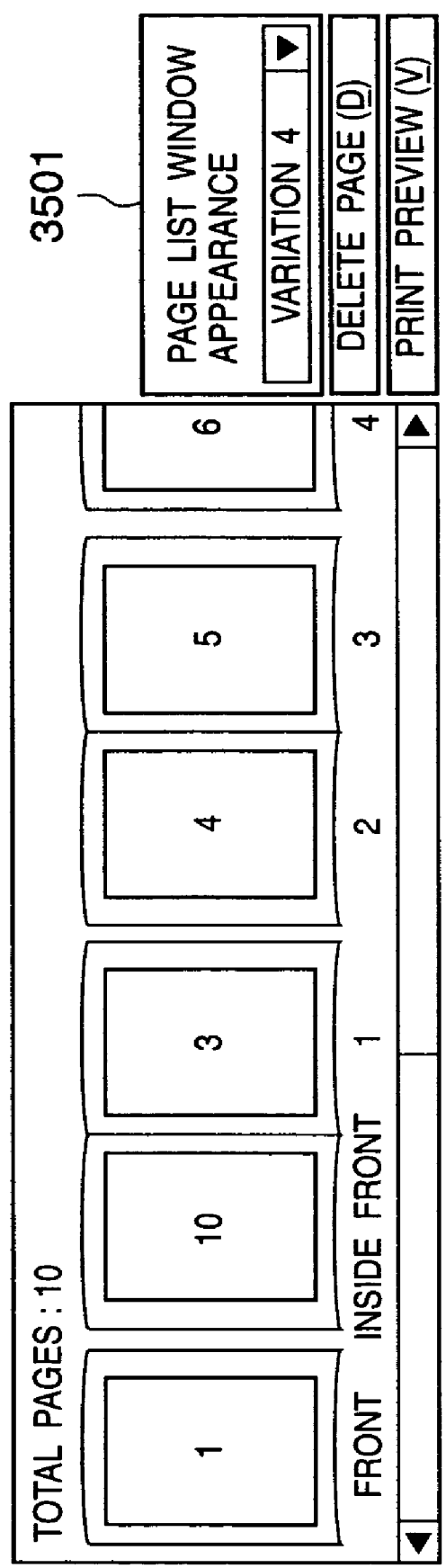
FIG. 38 shows a display example of a preview window that handles cover pages as part of booklet pages in the cover booklet printing mode.

The document preview function itself is the same as the logical page reference of the normal booklet print mode. However, upon displaying pages, cover portions such as "front", "inside front", "inside back", and "back" are clearly specified. FIG. 38 shows the preview state of this case. In such case, a front cover page, a page spread of the inside front cover page and the first body text page, and a page spread of the second and third body text pages are displayed in turn.

These pages are preview images of the cover pages, and those of body text pages follow while being divided in the same manner as in a case wherein the preview booklet unit is designated.

<Acquisition of Booklet Print Page Template>

Figure 27:
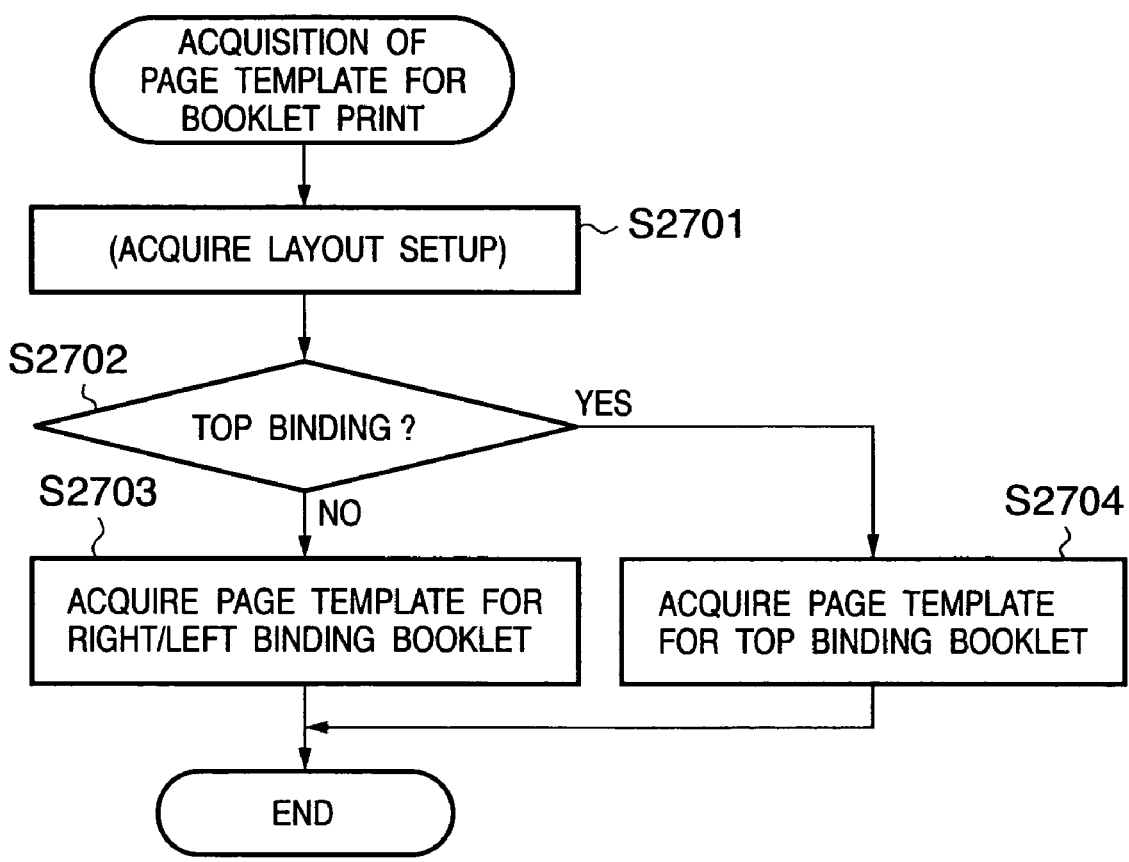
FIG. 27 is a flow chart showing the page template acquisition sequence in a booklet printing mode.
Figure 39:
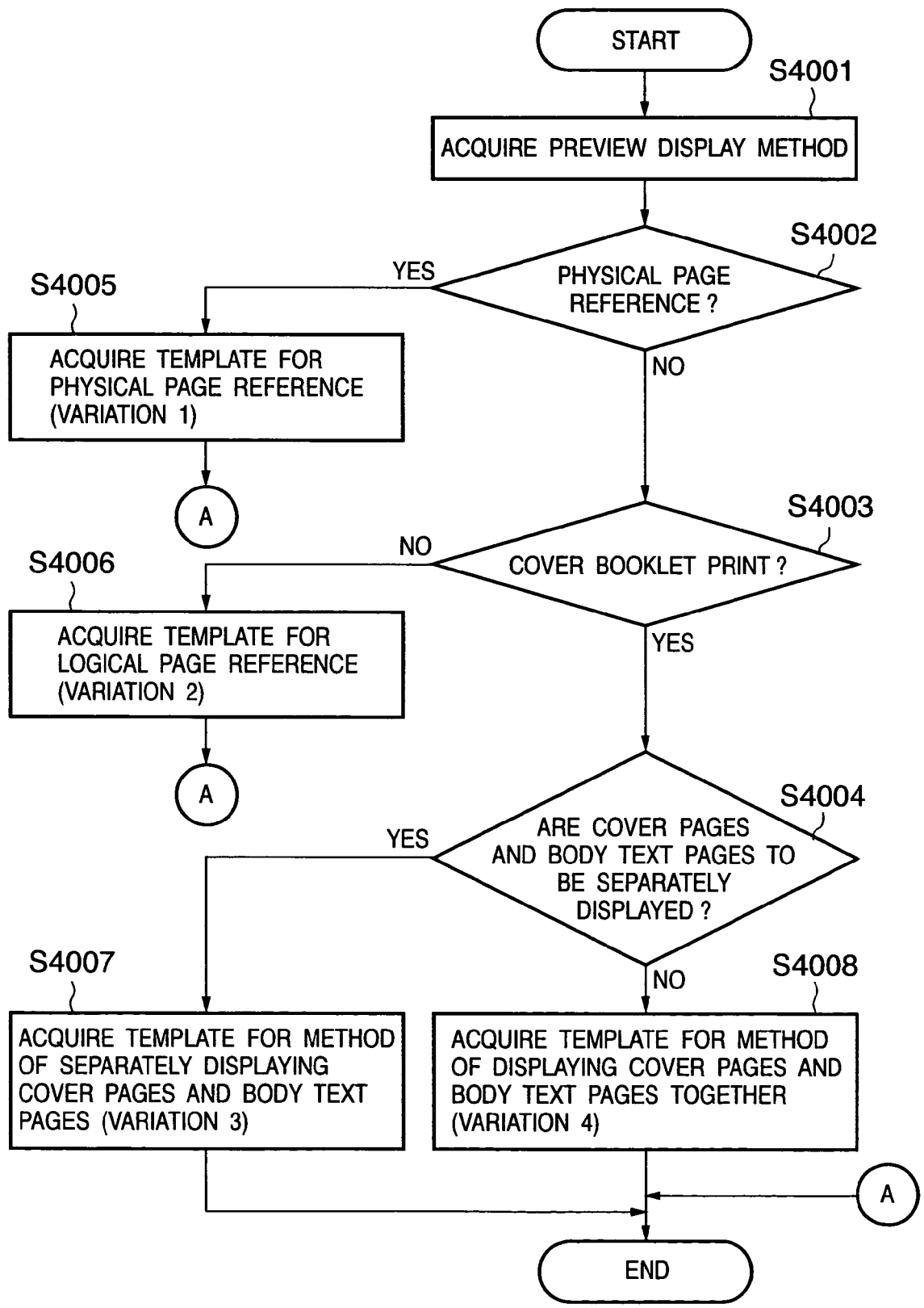
FIG. 39 is a flow chart showing the process for determining a display variation in the page template acquisition sequence in the booklet printing mode.

FIGS. 27 and 39 are flow charts showing the page template acquisition sequence in the booklet print mode, and correspond to step S2304 in FIG. 23.

Referring to FIG. 27, after the layout setups are acquired in step S2701, it is checked in step S2702 if top binding is set as the binding direction of a booklet. If YES in step S2702, a top binding page template for booklet print is acquired in step S2704. FIG. 34B shows an example of the preview window rendered using the top binding page template. In this case, the logical page reference display method is adopted, and the first page, second and third pages, . . . , are displayed in turn from the left side. In the top binding booklet print preview mode, since a booklet has a landscape appearance, the front cover (first page) and back cover (eighth page) use landscape templates. Since middle pages are displayed as upward page spreads, a template that can display a spread of upper and lower pages to have the horizontal fold line as the center is used like pages 3402.

If the binding direction is not top binding, i.e., if it is right/left binding, a right/left binding page template is acquired in step S2703. FIG. 36 shows a display example. In this case, since pages are spread in the right-and-left direction, a template which can display a spread of right and left pages to have the vertical fold line as the center is used like pages 3001. Such template need not distinguish right or left binding.

After the binding direction of a booklet is acquired, page templates to be displayed are determined in accordance with the process in FIG. 39. In step S4001, a preview display method is acquired. If it is determined in step S4002 that the display method is physical page reference, the flow advances to step S4005 to acquire templates for physical page reference (variation 1). On the other hand, if it is determined in step S4001 that the display method is not physical page reference, the flow advances to step S4003 to check if a cover booklet print function is selected. If the cover booklet print function is selected, the flow advances to step S4004; otherwise, since a normal booklet print process is to be done, templates for logical page reference (variation 2) are acquired in step S4006. It is checked in step S4004 if cover pages and body text pages are to be displayed independently. If YES in step S4004, the flow advances to step S4007 to acquire templates for variation 3; otherwise, the flow advances to step S4008 to acquire those for variation 4.

The templates acquired in this way are rendered in step S2305 in FIG. 23.

(Page Number Rendering for Booklet Print)

Figure 28:
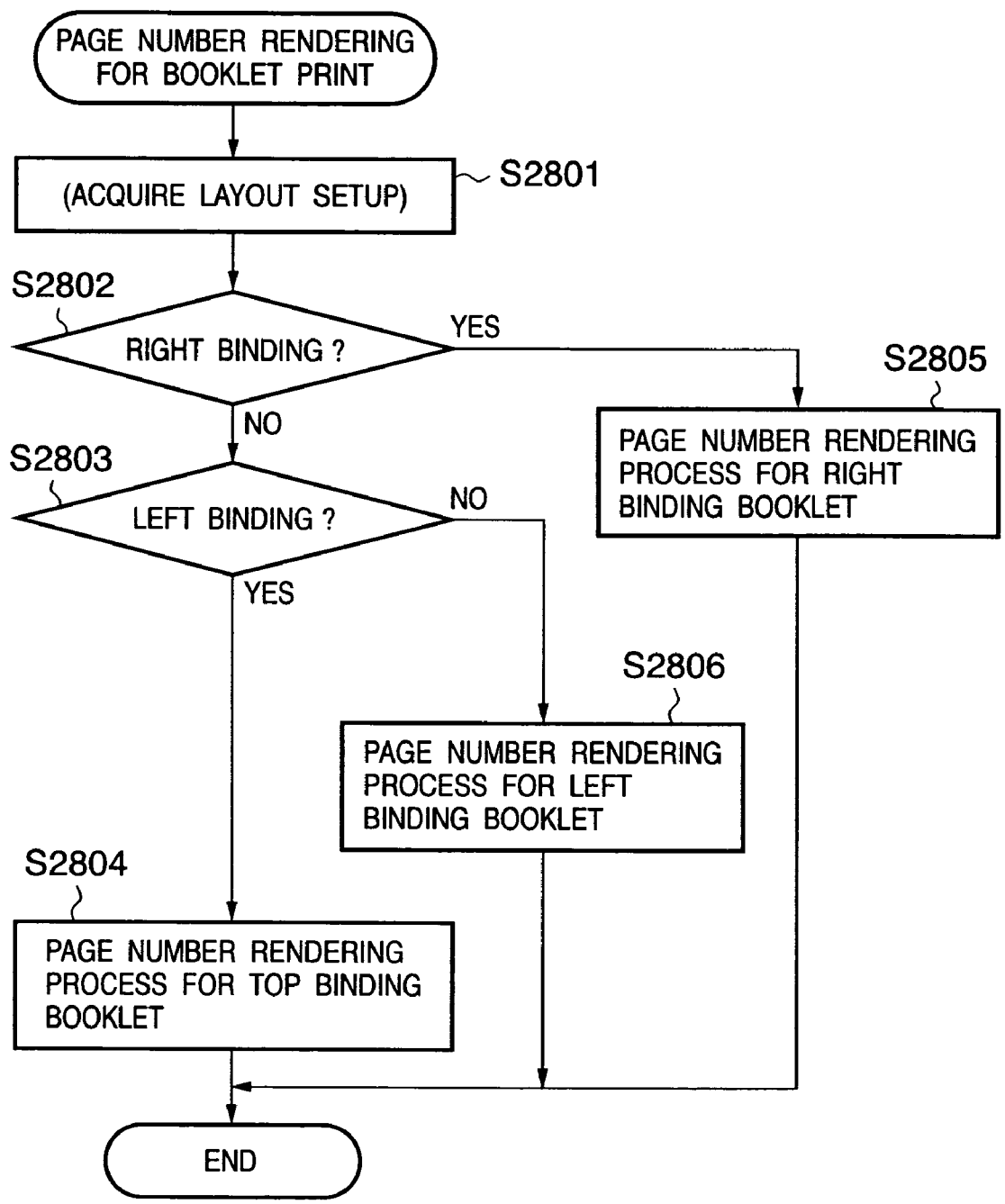
FIG. 28 is a flow chart showing the page number rendering sequence in the booklet printing mode.
Figure 40:
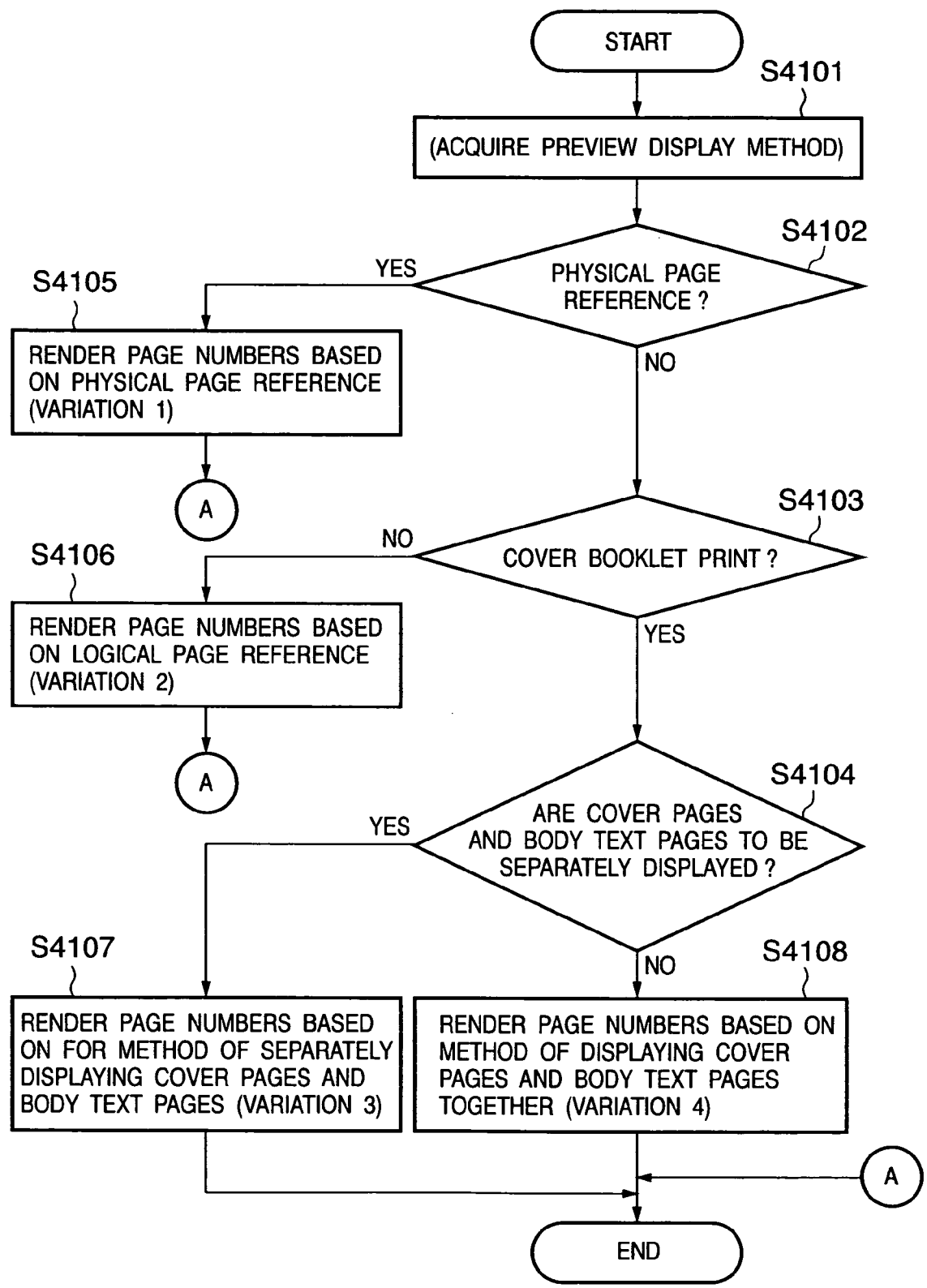
FIG. 40 is a flow chart showing the process for determining a display variation in the page number rendering sequence in the booklet printing mode.

FIGS. 28 and 40 are flow charts showing the page number rendering sequence in the booklet print mode, and correspond to step S2404 in FIG. 24.

Referring to FIG. 28, after the layout setups are acquired in step S2801, it is checked in step S2802 if right binding is set as the binding direction of a booklet. If YES in step S2802, page numbers for a right binding booklet are rendered in step S2805. If NO in step S2802, it is checked in step S2803 if left binding is set. If YES in step S2803, page numbers for a left binding booklet are rendered in step S2806. If NO in step S2803, since top binding is set, page numbers for a top binding booklet are rendered in step S2804.

FIG. 36 shows a rendering example of page numbers for left binding. In this case, page numbers are assigned from the left to right as pages appear. FIG. 34A shows a rendering example of page numbers for right binding. In this case, page numbers are assigned from the right to left as pages appear. FIG. 34B shows a rendering example of page numbers for top binding. In this case, page numbers are assigned together in increments of two pages as pages appear.

In each of the processes of steps S2803, S2804, and S2805, a rendering process is executed in practice after the display method is determined in the sequence shown in FIG. 40.

Referring to FIG. 40, after the binding direction of a booklet is acquired, a page rendering method according to the page templates to be displayed is determined. In step S4101, the preview display method is acquired. If it is determined in step S4102 that the display method is physical page reference, the flow advances to step S4105 to render page numbers according to physical page reference (variation 1). On the other hand, if it is determined in step S4102 that the display method is not physical page reference, the flow advances to step S4103 to check if the cover booklet print function is selected. If YES in step S4103, the flow advances to step S4104; otherwise, since a normal booklet print process is to be done, page numbers are rendered in accordance with logical page reference (variation 2) in step S4106. It is checked in step S4104 if cover pages and body text pages are to be displayed independently in the cover booklet print function. If YES in step S4104, the flow advances to step S4107 to render page numbers according to variation 3; otherwise, the flow advances to step S4108 to render page numbers according to variation 4.

(Logical Page Rendering for Booklet Print)

After the template rendering process in FIGS. 27 and 39 and the page number rendering process in FIGS. 28 and 40, the contents of logical pages are rendered.

Figure 29:
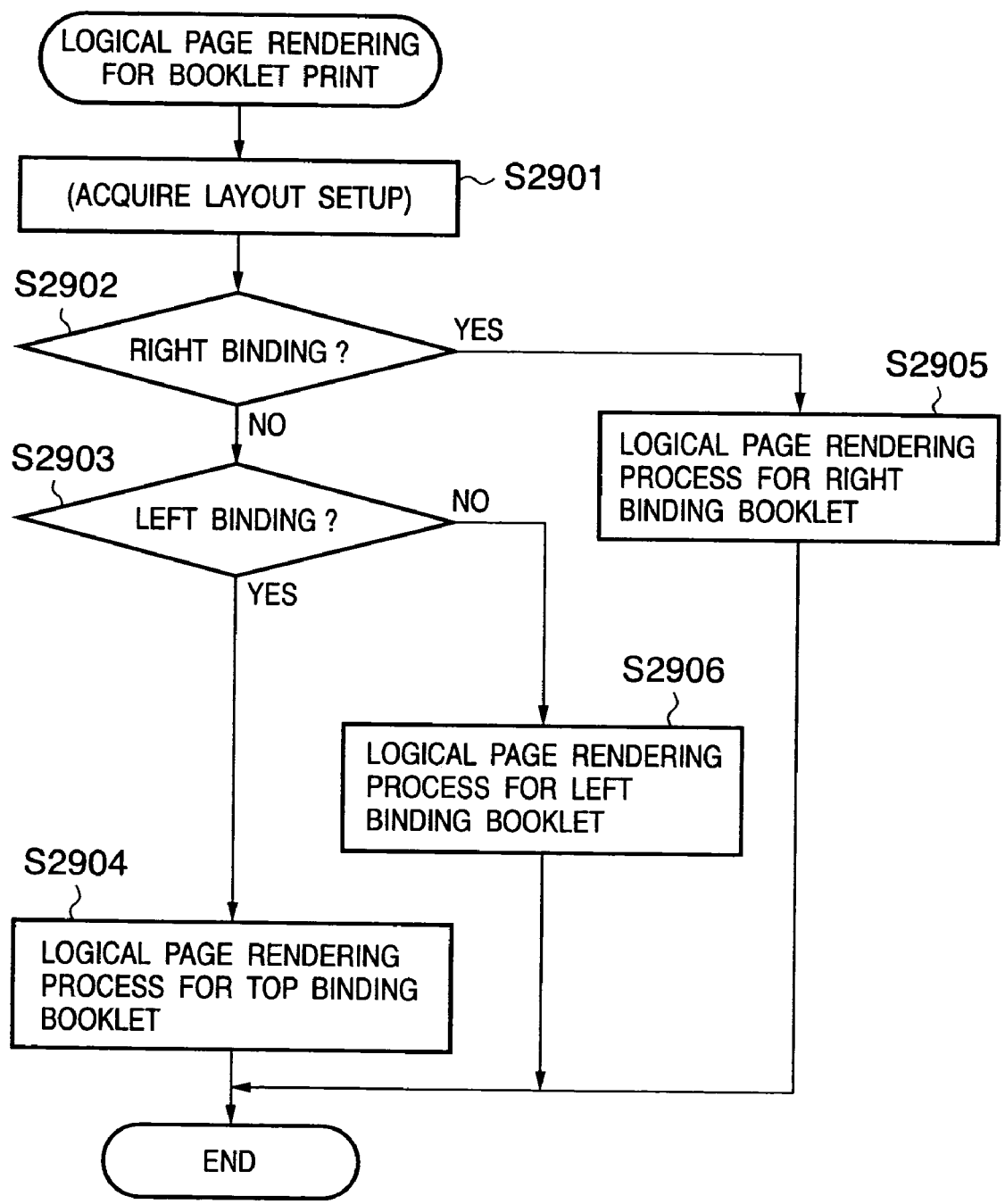
FIG. 29 is a flow chart showing the logical page rendering sequence in the booklet printing mode.
Figure 41:
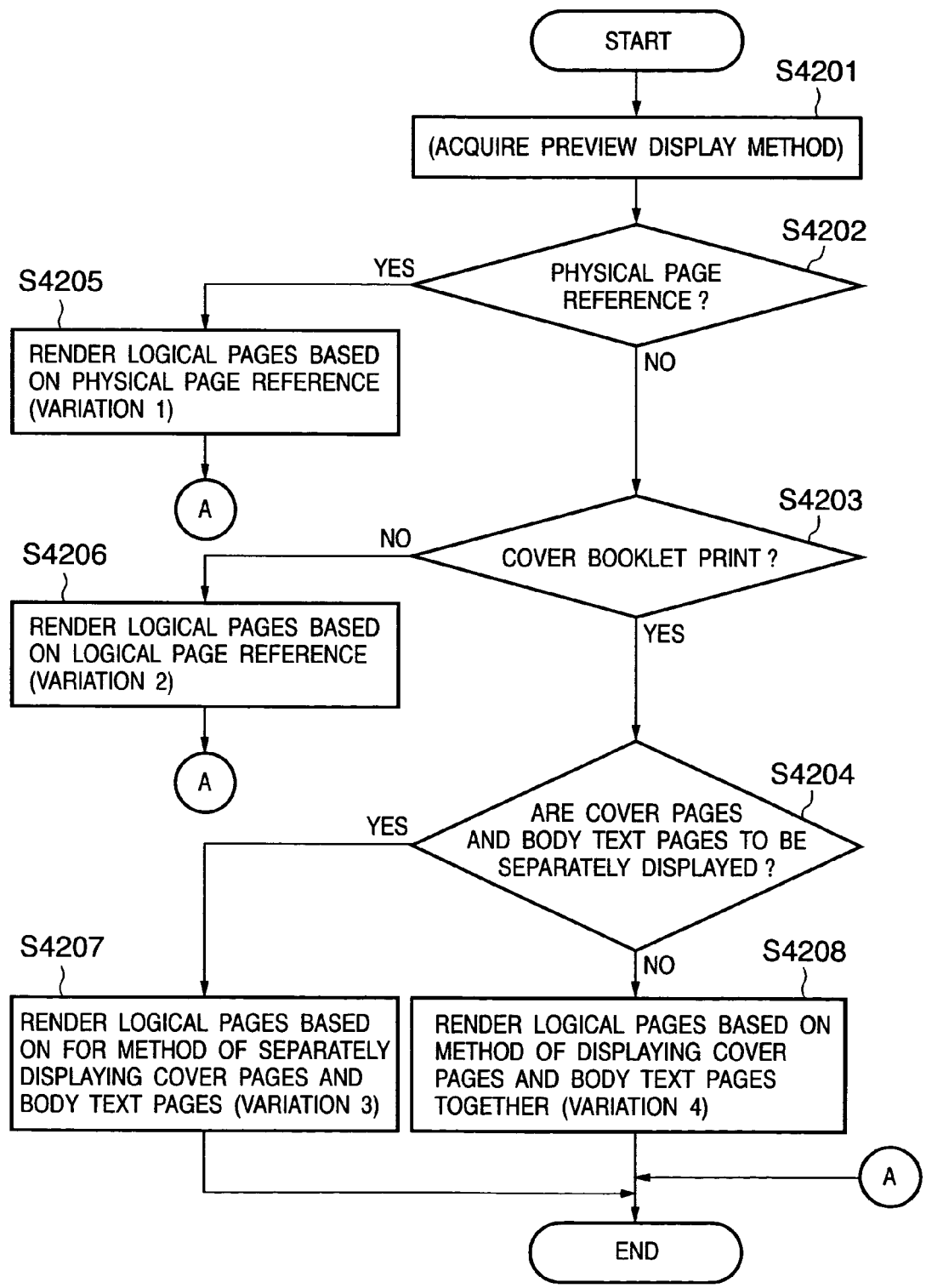
FIG. 41 is a flow chart showing the process for determining a display variation in the logical page rendering sequence in the booklet printing mode.

FIGS. 29 and 41 are flow charts showing the page number rendering sequence in the booklet print mode, and correspond to step S2504 in FIG. 25.

Referring to FIG. 29, after the layout setups are acquired in step S2901, it is checked in step S2902 if right binding is set as the binding direction of a booklet. If YES in step S2902, a logical page rendering process for a right binding booklet is executed in step S2905. If NO in step S2902, it is checked in step S2903 if left binding is set. If YES in step S2903, the flow advances to step S2906 to execute a logical page rendering process for a left binding booklet. If NO in step S2903, since top binding is set, a logical page rendering process for a top binding booklet is executed in step S2904.

In each of the processes of steps S2903, S2904, and S2905, a rendering process is executed in practice after the display method is determined in the sequence shown in FIG. 41.

Referring to FIG. 41, after the binding direction of a booklet is acquired, a page rendering method according to the page templates to be displayed is determined. In step S4201, the preview display method is acquired. If it is determined in step S4202 that the display method is physical page reference, the flow advances to step S4205 to render logical pages according to physical page reference (variation 1). On the other hand, if it is determined in step S4202 that the display method is not physical page reference, the flow advances to step S4203 to check if the cover booklet print function is selected. If YES in step S4203, the flow advances to step S4204; otherwise, since a normal booklet print process is to be done, logical pages are rendered in accordance with logical page reference (variation 2) in step S4206. It is checked in step S4204 if cover pages and body text pages are to be displayed independently in the cover booklet print function. If YES in step S4204, the flow advances to step S4207 to render logical pages according to variation 3; otherwise, the flow advances to step S4208 to render logical pages according to variation 4.

As described above, according to the print control method and apparatus of this embodiment, if a booklet print mode is designated upon previewing a job spooled on a host, different display methods are provided to implement preview displays that the user wants. The first method is a physical page reference preview method as in the 2-sided print mode, and the second method is a page-spread preview method, i.e., logical page reference preview method. When the logical page reference preview mode is selected, the user can confirm the print result after a booklet is formed. When the physical page reference preview mode is designated, the user can confirm the result on a print sheet itself.

In the cover booklet print function, since means for independently displaying preview images of cover pages and body text pages, and means for displaying preview images of cover pages and body text pages together are provided, a preview display function that the user wants can be implemented.

In the logical page reference, since a unit to be displayed as a page spread is changed in accordance with a designated booklet unit, a print result, i.e., divided booklet pages, that do not allow the user to easily imagine the output result can be confirmed on the preview window.

Therefore, according to the above arrangement, a convenient print control technique can be provided.

Another Embodiment

Though the embodiments of the invention have been described above, this invention may be applied to the system consisting of one or more devices.

This invention may be achieved in such a manner that a software program for implementing the functions of the above embodiments is supplied directly or remotely to the system or device, and the computer for the system or device reads out and executes the program code. In this case, any other means than the program may be employed, so far as the functions of the program are provided.

Accordingly, to allow the computer to implement the functions of the invention, the program code itself installed in the computer may implement the invention. That is, the program code itself for implementing the functions of the invention may be covered in the claims of the invention.

In this case, the program may take any form such as an object code, a program executed by the interpreter, and a script data supplied to the OS so far as the functions of the program are provided.

Examples of the storage medium for supplying the program may include a floppy disk (registered trademark), a hard disk, an optical disk, a magneto-optical disk, MO, CD-ROM, CD-R, CD-RW, a magnetic tape, a non-volatile memory card, ROM, and DVD (DVD-ROM, DVD-R), for example.

Besides, a method for supplying the program includes connecting to a home page of the Internet, employing the browser of the client computer, and downloading a computer program itself of the invention or a compressed file with an automatic install function from the home page into a storage medium such as a hard disk. Also, the program code composing the program of the invention may be supplied by dividing it into a plurality of files, each file being downloaded from different home page. That is, the WWW server for downloading the program file for implementing the functions of the invention on the computer to a plurality of users may be covered in the claims of the invention.

Also, the program of the invention may be encrypted and stored in a storage medium such as a CD-ROM, and distributed to the user, whereby the encrypted program is executed using the key information for decryption that is downloaded via the Internet from a home page to the user clearing the given conditions, and installed in the computer.

Also, the functions of the above embodiments may be implemented by executing the read program on the computer, or performing a part or all of the actual process under the OS operating on the computer on the basis of the instructions of the program.

Moreover, the functions of the above embodiments may be implemented in such a manner that the program read from the storage medium is written into a function extension board inserted into the computer or a memory provided for a function extension unit connected with the computer, and a part or all of the actual process is performed by the CPU provided for the function extension board or the function extension unit on the basis of the instructions of the program.

As many apparently widely different embodiments of the present invention can be made without departing from the spirit and scope thereof, it is to be understood that the invention is not limited to the specific embodiments thereof except as defined in the appended claims.

What is claimed is:

1. A computer-readable storage medium storing a computer-executable program, said computer-executable program being executable by an information processing apparatus so as to control the information processing apparatus to execute a print control method, the method comprising:
    a designating step of designating a bookbinding printing mode in which logical pages included in document data to be printed are arranged so that a book is produced by stacking and folding sheets in which the logical pages are printed;
    a selection step of accepting a selection of a first display mode or a second display mode for displaying a preview image in the bookbinding printing mode;
    a first display step of displaying, as the preview image, the logical pages in the order of page numbers which are to be added to the bound book, responsive to selection of the first display mode; and
    a second display step of displaying, as the preview image, the logical pages in the form of layouts which are to be printed on each sheet of the unbound book, responsive to selection of the second display mode.

2. The computer-readable storage medium according to claim 1, wherein the method further comprises:
    a spool step of converting image data to be printed into intermediate code data, and temporarily saving the intermediate code data; and
    a despool step of generating the print job based on the temporarily saved intermediate code data.

3. The computer-readable storage medium according to claim 1, wherein in the selection step, a third display mode can be selected,
    and wherein responsive to selection of the third display mode, logical pages to be printed on the cover page and back cover page are shown before body pages as the preview image.

4. An information processing apparatus comprising:
    a computer-readable storage medium of claim 1; and
    processing means for reading out and executing the computer-executable program from said computer-readable storage medium.

5. A print control method comprising:
    a designating step of designating a bookbinding printing mode in which logical pages included in document data to be printed are arranged so that a book is produced by stacking and folding sheets in which the logical pages are printed;
    a selection step of accepting a selection of a first display mode or a second display mode for displaying a preview image in the bookbinding printing mode;
    a first display step of displaying, as the preview image, the logical pages in the order of page numbers which are to be added to the bound book, responsive to selection of the first display mode; and
    a second display step of displaying, as the preview image, the logical pages in the form of layouts which are to be printed on each sheet of the unbound book, responsive to selection of the second display mode.

6. The method according to claim 5, further comprising:
    a spool step of converting image data to be printed into intermediate code data, and temporarily saving the intermediate code data; and
    a despool step of generating the print job based on the temporarily saved intermediate code data.

7. The method according to claim 5, wherein in the selection step, a third display mode can be selected,
    and wherein in the third display mode, logical pages to be printed on the cover page and back cover page are shown before body pages as the preview image.

8. A print control apparatus comprising:
    designating means for designating a bookbinding printing mode in which logical pages included in document data to be printed are arranged so that a book is produced by stacking and folding sheets in which the logical pages are printed;
    selection means for accepting a selection of a first display mode or a second display mode for displaying a preview image in the bookbinding printing mode;
    first display means for displaying, as the preview image, the logical pages in the order of page numbers which are to be added to the bound book, responsive to selection of the first display mode; and
    second display means of displaying, as the preview image, the logical pages in the form of layouts which are to be printed on each sheet of the unbound book, responsive to selection of the second display mode.

9. The apparatus according to claim 8, further comprising:
    spool means for converting image data to be printed into intermediate code data, and temporarily saving the intermediate code data; and
    despool means for generating the print job based on the temporarily saved intermediate code data.

10. The apparatus according to claim 8, wherein the selection means selects a third display mode,
    and wherein in the third display mode, logical pages to be printed on the cover page and back cover page are shown before body pages as the preview image.

* * * * *